(12) United States Patent
Yamada et al.

(10) Patent No.: US 7,796,226 B2
(45) Date of Patent: Sep. 14, 2010

(54) LIQUID CRYSTAL DISPLAY DEVICE

(75) Inventors: Yasuyuki Yamada, Mobara (JP); Masateru Morimoto, Mobara (JP)

(73) Assignees: IPS Alpha Technology, Ltd., Chiba (JP); Hitachi Displays, Ltd., Chiba (JP)

( * ) Notice: Subject to any disclaimer, the term of this patent is extended or adjusted under 35 U.S.C. 154(b) by 178 days.

(21) Appl. No.: 12/289,502

(22) Filed: Oct. 29, 2008

(65) Prior Publication Data

US 2009/0115946 A1 May 7, 2009

(30) Foreign Application Priority Data

Nov. 1, 2007 (JP) ............................. 2007-285100

(51) Int. Cl.
  *G02F 1/1343* (2006.01)
  *G02F 1/1335* (2006.01)
(52) U.S. Cl. ..................... 349/141; 349/99; 349/139
(58) Field of Classification Search ................. 349/99, 349/96, 123, 128, 139, 141, 41, 43, 143, 349/144, 146
See application file for complete search history.

(56) References Cited

U.S. PATENT DOCUMENTS

| | | | |
|---|---|---|---|
| 6,567,144 B1 * | 5/2003 | Kim et al. | 349/128 |
| 6,822,714 B1 * | 11/2004 | Saito | 349/129 |
| 6,897,930 B2 * | 5/2005 | Nakayoshi et al. | 349/139 |
| 7,564,530 B2 * | 7/2009 | Hu et al. | 349/143 |
| 7,599,035 B2 * | 10/2009 | Park et al. | 349/141 |
| 2007/0153197 A1 * | 7/2007 | Park et al. | 349/141 |
| 2009/0115946 A1 * | 5/2009 | Yamada et al. | 349/99 |

* cited by examiner

Primary Examiner—Brian M Healy
(74) Attorney, Agent, or Firm—Stites & Harbison, PLLC; Juan Carlos A. Marquez, Esq.

(57) ABSTRACT

An absorption axis of a polarizer on a viewer's side is set to an arbitrary direction to cope with problems attributed to polarization sunglasses or the like. Video lines extend in a reference direction as a whole while being bent locally. Assuming a narrow-side angle out of intersection angles between the reference direction and the extension direction of a portion of the video line as $\theta 1$, assuming a narrow-side angle out of intersection angles between the reference direction and the extension direction of the linear portions of the first electrode as $\theta 2$, assuming a narrow-side angle out of intersection angles between the reference direction and an alignment axis of the second alignment film as $\theta 3$, assuming a narrow-side angle out of intersection angles between the reference direction and an absorption axis of the second polarizer as $\theta 4$, and in measuring the angles $\theta 1$, $\theta 2$, $\eta 3$ and $\theta 4$ within a range from $-90°$ to $+90°$ from the reference direction while setting a clockwise direction as a normal direction, all of a sign of the angle $\theta 1$, a sign of the angle $\theta 2$ and a sign of the angle $\theta 3$ are equal in one sub pixel, the angles $\theta 1$ of all sub pixels have the same sign, and the formulae (1) $10° \leq |\theta 1| \leq |\theta 3|$ and $10° \leq |\theta 2| \leq |\theta 3|$; (2) $0° \leq |\theta 3 - \theta 2| \leq 20°$; (3) $0° \leq |\theta 1 - \theta 2| \leq 2°$; (4) $10° \leq |\theta 3| \leq 80°$; and (5) $0° \leq |\theta 3 - \theta 4| \leq 2°$ or $88° \leq |\theta 3 - \theta 4| \leq 92°$ are satisfied in all sub pixels.

46 Claims, 18 Drawing Sheets

LIQUID CRYSTAL DISPLAY DEVICE

The present application claims priority from Japanese application JP2007-285100 filed on Nov. 1, 2007, the content of which is hereby incorporated by reference into this application.

BACKGROUND OF THE INVENTION

1. Field of the Invention

The present invention relates to a liquid crystal display device, and more particularly to a liquid crystal display device which includes a means for overcoming problems attributed to polarization sunglasses.

2. Description of the Related Art

A TFT-type liquid crystal display panel which uses a thin film transistor as an active element can display a high-definition image and hence, such a liquid crystal display panel has been used as a display device of a television receiver set, a personal computer display or the like. Particularly, a miniaturized TFT-type liquid crystal display device has been popularly used as a display part of a mobile phone.

On the other hand, as such a TFT-type liquid crystal display panel, a vertical-electric-field-type (for example, TN-type, ECB-type, VA-type or the like) liquid crystal display panel, and a lateral-electric-field-type (also referred to as IPS-method) liquid crystal display panel have been known. It is also known that the liquid crystal display panel adopting the IPS-method can acquire a broad viewing angle.

In general, the liquid crystal display panel adopting the IPS-method is constituted of a first substrate (hereinafter also referred to as a TFT substrate), a second substrate (hereinafter also referred to as a counter substrate), and liquid crystal sandwiched between the first substrate and the second substrate. The first substrate includes a first alignment film arranged on a liquid-crystal-side surface thereof and a first polarizer arranged on a surface thereof opposite to the liquid crystal, while the second substrate includes a second alignment film arranged on a liquid-crystal-side surface thereof and a second polarizer arranged on a surface thereof opposite to the liquid crystal.

Further, on the liquid crystal display panel, within a region surrounded by two neighboring scanning lines (also referred to as gate lines) and two neighboring-video lines (also referred to as drain lines), a thin film transistor which is turned on in response to a scanning signal from a scanning line and a pixel electrode to which a video signal from a video line is supplied via the thin film transistor are formed thus constituting a so-called sub pixel.

FIG. 14A and FIG. 14B are views for explaining one example of the electrode structure of a conventional liquid crystal display panel adopting an IPS method, wherein FIG. 14A is a plan view, and FIG. 14B is a cross-sectional view of an essential part showing the cross-sectional structure taken along a line A-A in FIG. 14A. In FIG. 14A, a counter electrode (CT) is omitted. In FIG. 14B, the constitution of parts other than the constitution of a pixel electrode (PX), the counter electrode (CT) and an interlayer insulation film (PAS1) is omitted.

In the electrode structure shown in FIG. 14, the counter electrode (CT) is formed in a planar shape, and the pixel electrode (PX) is formed of an electrode having a plurality of slits (SLT). Portions which are divided by the slits (SLT) form linear portions (comb-teeth electrodes) (KSB) of the pixel electrode (PX). The pixel electrode (PX) and the counter electrode (CT) are formed of a transparent conductive film made of ITO (Indium Tin Oxide) or the like, for example. Although each slit (SLT) shown in FIG. 14 has both ends thereof closed, one end of the slit (SLT) may be opened.

Further, the pixel electrode (PX) having the linear portions and the planar counter electrode (CT) are stacked to each other with an interlayer insulation film (PAS1) sandwiched therebetween. By generating arcuate lines of electric force generated between the pixel electrodes (PX) and the counter electrode (CT) such that the lines of electric force are distributed in the liquid crystal layer in a penetrating manner thus changing the alignment of the liquid crystal display layer (LC).

FIG. 15 is a plan view for explaining another example of the electrode structure of a conventional liquid crystal display panel adopting an IPS method.

The electrode structure shown in FIG. 15 differs from the above-mentioned electrode structures explained in conjunction with FIG. 14 with respect to a point that both of the pixel electrode (PX) and the counter electrode (CT) are formed of an electrode having linear portions (comb-teeth electrode) (KSB), and the linear portion of the counter electrode (CT) is arranged between the neighboring linear portions of the pixel electrode (PX). Further, the pixel electrodes (PX) and the counter electrodes (CT) may be formed on the same layer or may be formed on different layers by interposing an insulation film between the pixel electrodes (PX) and the counter electrodes (CT). In FIG. 14 and FIG. 15, symbol DL indicates video lines, and symbol GL indicates scanning lines.

In both cases shown in FIG. 14 and FIG. 15, the pixel electrodes (PX) and the counter electrode (CT) are formed together on the same substrate, and electric fields are generated due to differences in potential between the pixel electrodes (PX) and the counter electrode (CT) thus driving liquid crystal.

Conventionally, on the liquid crystal display panel adopting the IPS-method, video lines (DL) are arranged so as to be parallel to either one of long sides or short sides of a rectangular display region, and scanning lines (GL) are arranged orthogonal to the video lines (DL).

Further, the pixel electrode (PX) of the liquid crystal display panel adopting the IPS-method includes linear portions. In the typical liquid crystal display panel adopting the IPS-method, when the pixel has the so-called single domain structure, the linear portions of the above-mentioned pixel electrodes (PX) are arranged parallel to the video lines (DL). Here, in the pixel having the so-called single domain structure, the extension direction of the linear portions of the pixel electrode (PX) in one sub pixel is mainly directed in one direction. On the other hand, when the pixel has the so-called multi domain structure, the extension direction of the linear portions of the pixel electrode (PX) in one sub pixel is mainly directed in two directions.

Further, an alignment axis (or a rubbing direction) of the first alignment film and an alignment axis of the second alignment film are set to the same direction, and linear portions of a pixel electrode (PX) is formed such that a narrow-side angle out of intersecting angles between the alignment axis of the first alignment film (or the alignment axis of the second alignment film) and an extension direction of the linear portions of the pixel electrode (PX) assumes a predetermined angle (hereinafter referred to as a pre-twist angle, usually being set to a value ranging from approximately −20° to 20°).

Further, an absorption axis of the first polarizer and an absorption axis of the second polarizer are set to be orthogonal to each other and, at the same time, either one of the absorption axis of the first polarizer and the absorption axis of the second polarizer is set to agree with the alignment axis of the first alignment film and the alignment axis of the second alignment film.

With respect to sunglasses, there exist sunglasses having polarization characteristic, and such polarization sunglasses have an absorption axis in the lateral direction. Accordingly, when an absorption axis of a polarizer on a viewer's side becomes orthogonal to the absorption axis of the polarization sunglasses, when a viewer wears the polarization sunglasses, there arises a situation where the viewer cannot observe an image. Further, even when the absorption axis of the polarizer is slightly displaced from the direction orthogonal to the absorption axis of the polarization sunglasses, there arises a drawback that a display is darkened.

By arranging the absorption axis of the polarizer on a viewer's side and the absorption axis of the polarization sunglasses parallel to each other, such a drawback that a display is darkened can be obviated. However, recently, in a technical field such as a PC monitor, a personal digital assistant or the like, for example, there has been known a liquid crystal display device which allows the viewer to use the liquid crystal display device by rotating a liquid crystal display panel by 90°. In this case, however, when the viewer wears the polarization sunglasses, there arises a drawback that a display becomes darkened either before or after the rotation of the liquid crystal display panel.

To cope with such a drawback attributed to the polarization sunglasses, it is necessary to set the absorption axis of the polarizer on a viewer's side to an angle which falls within a range from 10° to 80° which is away from 0° and 90° by 10° or more, or an angle which falls within a range from −10° to −80°. It is desirable to set the absorption axis of the polarizer on a viewer's side to an angle which falls within a range from 30° to 60° away from 0° and 90° by 30° or more or a value which falls within a range from −30° to −60°. Here, 0° indicates the extension direction of the video lines (DL), and 90° indicates the direction orthogonal to the extension direction of the video lines (DL). These angles are angles measured from 0° in the clockwise direction. Further, in this specification, the absorption axes, the alignment axis and the extension direction are not vectors and hence, the direction of 0° is equal to the directions of ±180°, and the direction of 90° is equal to the direction of −90°.

In case of a vertical-electric-field-type liquid crystal display panel, the direction of absorption axis of the polarizer on a viewer's side has a high-degree of freedom in designing. However, in case of the liquid crystal display panel adopting an IPS-method, due to reasons such as a control of the rotational directions of the liquid crystal molecules, it is necessary to incline the alignment axes of the first alignment film and the second alignment film by a pre-twist angle with respect to the extension direction of the linear portions of the pixel electrode (PX) thus giving rise to a drawback peculiar to the liquid crystal display panel of IPS-method that the direction of the absorption axis adopting the polarizer on a viewer's side cannot be arranged irrelevant to the extension direction of the linear portions of the pixel electrode.

In the conventional liquid crystal display panel adopting the IPS-method, when the pixel has the single domain structure, there has been known the pixel structure in which assuming the extension direction of the video lines (DL) as the direction of twelve o'clock as well as the direction of 0°, the extension direction of the pixel electrode (PX) is directed in the direction of 0° and an absorption axis of a polarizer on a viewer's side on a is directed in the direction of −75 or −80. However, such structure merely inclines the absorption axis of the polarizer on a viewer's side by 10° or 15° which constitutes the pre-twist angle from the direction of 0° or 90° and hence, such pixel structure may be insufficient in inclination. Further, there may be a case that the inclination of the angle of absorption axis of the polarizer on a viewer's side in the free direction exceeding the pre-twist angle from the direction of 0° or 90° is requested.

Further, in the conventional liquid crystal display panel adopting the IPS-method, when the pixel has the multi domain structure, in general, the alignment axis of the alignment film and the absorption axis of the polarizer are set to the direction of 0° or 90°, and in one sub pixel, the extension direction of the linear portions of the pixel electrode (PX) is inclined in the normal direction by an amount of the pre-twist angle with respect to the alignment axis of the alignment film in a partial region, and is inclined in the negative direction by an amount of the pre-twist angle with respect to the alignment axis of the alignment film in another region. Accordingly, when the pixel has the multi domain structure, it is more difficult to cope with drawbacks attributed to polarization sunglasses compared to the pixel which has the single domain structure.

SUMMARY OF THE INVENTION

The present invention has been made to overcome the above-mentioned drawbacks of the related art, and it is an object of the present invention to provide a technique on a liquid crystal display device which can set an absorption axis of a polarizer on a viewer's side to an arbitrary direction to cope with drawbacks attributed to polarization sunglasses.

The above-mentioned and other objects and novel features of the present invention will become apparent from the description of this specification and attached drawings.

To simply explain the summary of typical inventions among the inventions disclosed in this specification, they are as follows.

(1) According to a first aspect of the present invention, there is provided a liquid crystal display device including a liquid crystal display panel which comprises: a first substrate; a second substrate arranged closer to a viewer's side than the first substrate; and positive liquid crystal sandwiched between the first substrate and the second substrate, wherein the liquid crystal display panel includes a plurality of sub pixels within a display region, each sub pixel of the plurality of sub pixels includes a first electrode formed on the first substrate and a second electrode formed on the first substrate, and the liquid crystal display panel is configured to drive the liquid crystal by generating an electric field using the difference in potential between the first electrode and the second electrode, wherein the first substrate includes: a first alignment film arranged on a liquid-crystal-side surface thereof; a plurality of video lines configured to input a video signal to the respective sub pixels; and a first polarizer arranged on a surface thereof opposite to the liquid crystal, the second substrate includes: a second alignment film arranged on a liquid-crystal-side surface thereof; and a second polarizer arranged on a surface thereof opposite to the liquid crystal, the first electrode includes linear portions which extend in a direction of long sides out of the long sides and short sides of each sub pixel, an extension direction of the linear portions of the first electrode in one sub pixel is set to one direction, the video lines extend in a first direction along an arbitrary one side of the display region of the liquid crystal display panel as a whole while being bent locally, the first direction is set as a reference direction, and assuming a narrow-side angle out of intersection angles between the reference direction and the extension direction of a portion of the video line as θ1, assuming a narrow-side angle out of intersection angles between the reference direction and the extension direction of the linear portions of the first electrode as θ2, assuming a narrow-side angle out of intersection angles between the reference direction and an alignment axis of the second alignment film as Θ3, assuming a narrow-side angle out of intersection angles between the reference direction and an absorption axis of the second polarizer as θ4, and in measuring the angles θ1, θ2, θ3 and θ4 within a range from −90° to +90° from the reference direction while setting a clockwise direction as a normal direction, all of a sign of the angle θ1, a sign of the angle θ2 and a sign of the angle θ3 are equal in one sub pixel, the angles θ1 of all sub pixels have the same sign, and following formulae (1) to (5) are satisfied in all sub pixels.

$$10°≤|θ1|≤|Θ3| \text{ and } 10°≤|θ2|≤|Θ3| \quad (1)$$

$$0°≤|Θ3-θ2|≤20° \quad (2)$$

$$0°≤|θ1-θ2|≤2° \quad (3)$$

$$10°≤|Θ3|≤80° \quad (4)$$

$$0°≤|Θ3-θ4|≤2° \text{ or } 88°≤|Θ3-θ4|≤92° \quad (5)$$

(2) According to a second aspect of the present invention, there is provided a liquid crystal display device including a liquid crystal display panel which comprises: a first substrate; a second substrate arranged closer to a viewer's side than the first substrate; and negative liquid crystal sandwiched between the first substrate and the second substrate, wherein the liquid crystal display panel includes a plurality of sub pixels within a display region, each sub pixel of the plurality of sub pixels includes a first electrode formed on the first substrate and a second electrode formed on the first substrate, and the liquid crystal display panel is configured to drive the liquid crystal by generating an electric field using the difference in potential between the first electrode and the second electrode, wherein the first substrate includes: a first alignment film arranged on a liquid-crystal-side surface thereof; a plurality of video lines configured to input a video signal to the respective sub pixels; and a first polarizer arranged on a surface thereof opposite to the liquid crystal, the second substrate includes: a second alignment film arranged on a liquid-crystal-side surface thereof; and a second polarizer arranged on a surface thereof opposite to the liquid crystal, the first electrode includes linear portions which extend in a direction of long sides out of the long sides and short sides of each sub pixel, an extension direction of the linear portions of the first electrode in one sub pixel is set to one direction, the video lines extend in a first direction along an arbitrary one side of the display region of the liquid crystal display panel as a whole while being bent locally, the first direction is set as a reference direction, and assuming a narrow-side angle out of intersection angles between the reference direction and the extension direction of a portion of the video line as θ1, assuming a narrow-side angle out of intersection angles between the reference direction and the extension direction of the linear portions of the first electrode as θ2, assuming a narrow-side angle out of intersection angles between the reference direction and an alignment axis of the second alignment film as Θ3, assuming a narrow-side angle out of intersection angles between the reference direction and an absorption axis of the second polarizer as θ4, and in measuring the angles θ1, θ2, Θ3 and θ4 within a range from −90° to +90° from the reference direction while setting a clockwise direction as a normal direction, all of a sign of the angle θ1, a sign of the angle θ2 and a sign of the angle Θ3 are equal in one sub pixel, the angles θ1 of all sub pixels have the same sign, and following formulae (1) to (5) are satisfied in all sub pixels.

$$10°≤|θ1|≤|Θ3| \text{ and } 10°≤|θ2|≤|Θ3| \quad (1)$$

$$0°≤|Θ3-θ2|≤20° \quad (2)$$

$$0°≤|θ1-θ2|≤2° \quad (3)$$

$$10°≤|Θ3|≤80° \quad (4)$$

$$0°≤|Θ-θ4|≤2° \text{ or } 88°≤|Θ3-θ4|≤92° \quad (5)$$

(3) According to a second aspect of the present invention, there is provided a liquid crystal display device including a liquid crystal display panel which comprises: a first substrate; a second substrate arranged closer to a viewer's side than the first substrate; and positive liquid crystal sandwiched between the first substrate and the second substrate, wherein the liquid crystal display panel includes a plurality of sub pixels within a display region, each sub pixel of the plurality of sub pixels includes a first electrode formed on the first substrate and a second electrode formed on the first substrate, and the liquid crystal display panel is configured to drive the liquid crystal by generating an electric field using the difference in potential between the first electrode and the second electrode, wherein the first substrate includes: a first alignment film arranged on a liquid-crystal-side surface thereof; a plurality of scanning lines configured to input a scanning signal to the respective sub pixels; and a first polarizer arranged on a surface thereof opposite to the liquid crystal, the second substrate includes: a second alignment film arranged on a liquid-crystal-side surface thereof; and a second polarizer arranged on a surface thereof opposite to the liquid crystal, the first electrode includes linear portions which extend in a direction of short sides out of long sides and the short sides of each sub pixel, an extension direction of the linear portions of the first electrode in one sub pixel is set to one direction, the scanning lines extend in a first direction along an arbitrary one side of the display region of the liquid crystal display panel as a whole while being bent locally, the first direction is set as a reference direction, and assuming a narrow-side angle out of intersection angles between the reference direction and the extension direction of a portion of the scanning line as ϕ1, assuming a narrow-side angle out of intersection angles between the reference direction and the extension direction of the linear portions of the first electrode as ϕ2, assuming a narrow-side angle out of intersection angles between the reference direction and an alignment axis of the second alignment film as ϕ3, assuming a narrow-side angle out of intersection angles between the reference direction and an absorption axis of the second polarizer as ϕ4, and in measuring the angles ϕ1, ϕ2, ϕ3 and ϕ4 within a range from −90° to +90° from the reference direction while setting a clockwise direction as a normal direction, all of a sign of the angle ϕ1, a sign of the angle ϕ2 and a sign of the angle ϕ3 are equal in one sub pixel, the angles ϕ1 of all sub pixels have the same sign, and following formulae (1) to (5) are satisfied in all sub pixels.

$$10°≤|ϕ1|≤|ϕ3| \text{ and } 10°≤|ϕ2|≤|ϕ3| \quad (1)$$

$$0°≤|ϕ3-ϕ2|≤2° \quad (2)$$

$$0°≤|ϕ1-ϕ2|≤2° \quad (3)$$

$$10°≤|ϕ3|≤80° \quad (4)$$

$$0°≤|ϕ3-ϕ4|≤2° \text{ or } 88°≤|ϕ3-ϕ4|≤92° \quad (5)$$

(4) According to a second aspect of the present invention, there is provided a liquid crystal display device including a liquid crystal display panel which comprises: a first substrate; a second substrate arranged closer to a viewer's side than the first substrate; and negative liquid crystal sandwiched between the first substrate and the second substrate, wherein the liquid crystal display panel includes a plurality of sub pixels within a display region, each sub pixel of the plurality of sub pixels includes a first electrode formed on the first substrate and a second electrode formed on the first substrate, and the liquid crystal display panel is configured to drive the liquid crystal by generating an electric field using the difference in potential between the first electrode and the second electrode, wherein the first substrate includes: a first alignment film arranged on a liquid-crystal-side surface thereof; a plurality of scanning lines configured to input a scanning signal to the respective sub pixels; and a first polarizer arranged on a surface thereof opposite to the liquid crystal, the second substrate includes: a second alignment film arranged on a liquid-crystal-side surface thereof; and a second polarizer arranged on a surface thereof opposite to the liquid crystal, the first electrode includes linear portions which extend in a direction of short sides out of long sides and the short sides of each sub pixel, an extension direction of the linear portions of the first electrode in one sub pixel is set to one direction, the scanning lines extend in a first direction along an arbitrary one side of the display region of the liquid crystal display panel as a whole while being bent locally, the first direction is set as a reference direction, and assuming a narrow-side angle out of intersection angles between the reference direction and the extension direction of a portion of the scanning line as $\phi1$, assuming a narrow-side angle out of intersection angles between the reference direction and the extension direction of the linear portions of the first electrode as $\phi2$, assuming a narrow-side angle out of intersection angles between the reference direction and a direction orthogonal to an alignment axis of the second alignment film as $\Phi3$, assuming a narrow-side angle out of intersection angles between the reference direction and an absorption axis of the second polarizer as $\phi4$, and in measuring the angles $\phi1$, $\phi2$, $\Phi3$ and $\phi4$ within a range from $-90°$ to $+90°$ from the reference direction while setting a clockwise direction as a normal direction, all of a sign of the angle $\phi1$, a sign of the angle $\phi2$ and a sign of the angle $\Phi3$ are equal in one sub pixel, the angles $\phi1$ of all sub pixels have the same sign, and following formulae (1) to (5) are satisfied in all sub pixels.

$$10°\leq|\phi1|\leq|\Phi3| \text{ and } 10°\leq|\phi2|\leq|\Phi3| \quad (1)$$

$$0°\leq|\Phi3-\phi2|\leq20° \quad (2)$$

$$0°\leq|\phi1-\phi2|\leq2° \quad (3)$$

$$10°\leq|\Phi3|\leq80° \quad (4)$$

$$0°\leq|\Phi3-\phi4|\leq2° \text{ or } 88°\leq|\Phi3-\phi4|\leq92° \quad (5)$$

To simply explain advantageous effects acquired by the typical inventions among the inventions described in this specification, they are as follows.

According to the liquid crystal display device of the present invention, the absorption axis of the polarizer on a viewer's side can be set to the arbitrary direction and hence, even when a viewer wears polarization sun glasses, it is possible to prevent a case that the viewer cannot observe an image.

DETAILED DESCRIPTION OF THE INVENTION

Hereinafter, embodiments of the present invention are explained in detail in conjunction with attached drawings.

In all drawings for explaining embodiments, parts having identical functions are given same symbols and their repeated explanation is omitted.

Embodiment 1

Figure 1:
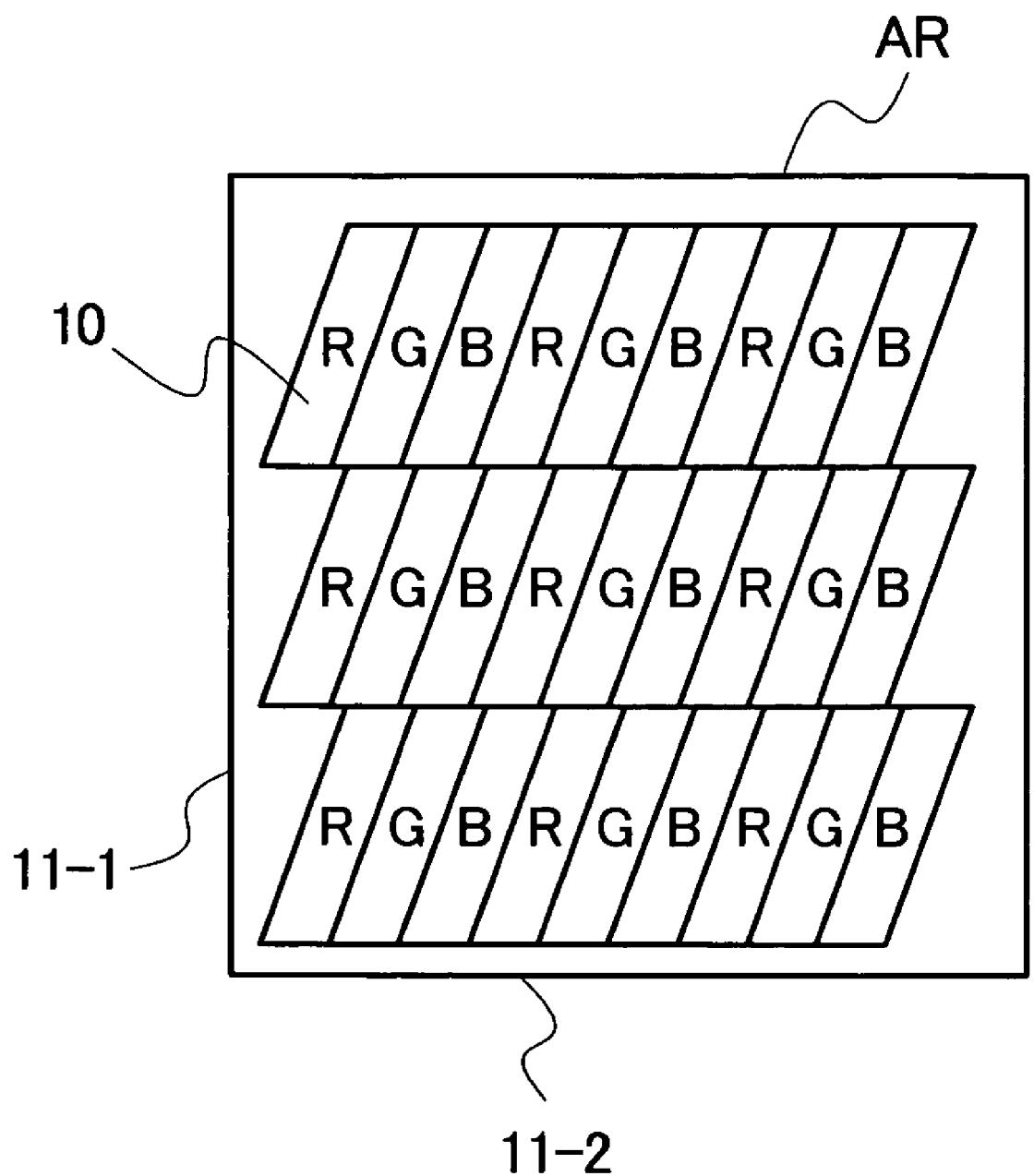
FIG. 1 is a schematic view showing the pixel arrangement of a liquid crystal display panel according to an embodiment 1 of the present invention.

FIG. 1 is a schematic view showing the pixel arrangement of a liquid crystal display panel according to an embodiment 1 of the present invention. The pixel arrangement of the conventional liquid crystal display panel is shown in FIG. 19 for a comparison purpose with the pixel arrangement of the liquid crystal display panel of this embodiment.

Figure 19:
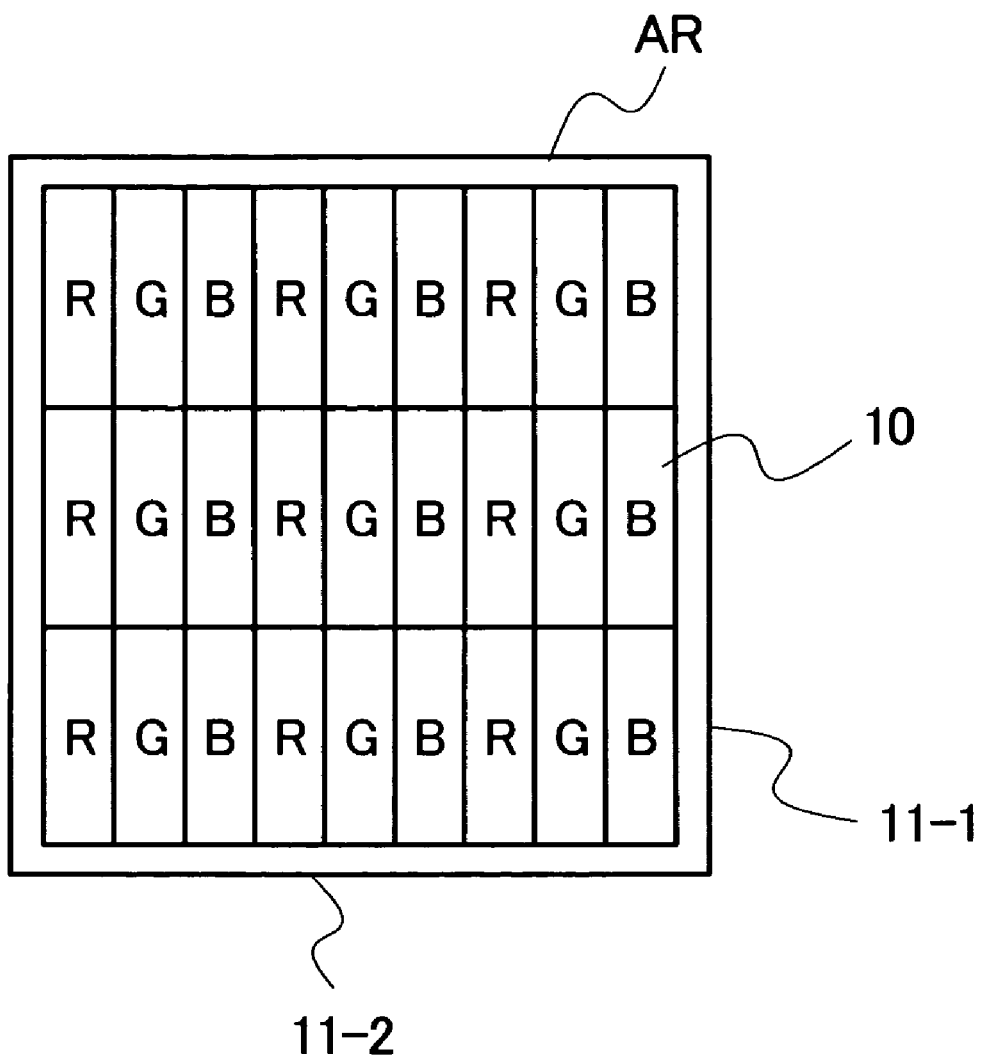
FIG. 19 is a view showing the pixel arrangement of a conventional liquid crystal display panel.

In the conventional liquid crystal display panel shown in FIG. 19, sub pixels 10 having a rectangular shape are arranged within a display region (AR) in the longitudinal direction as well as in the lateral direction. On the other hand, in the liquid crystal display panel of this embodiment, sub pixels 10 having a parallelogram shape are arranged within a display region (AR) in the longitudinal direction as well as in the lateral direction.

Figure 2:
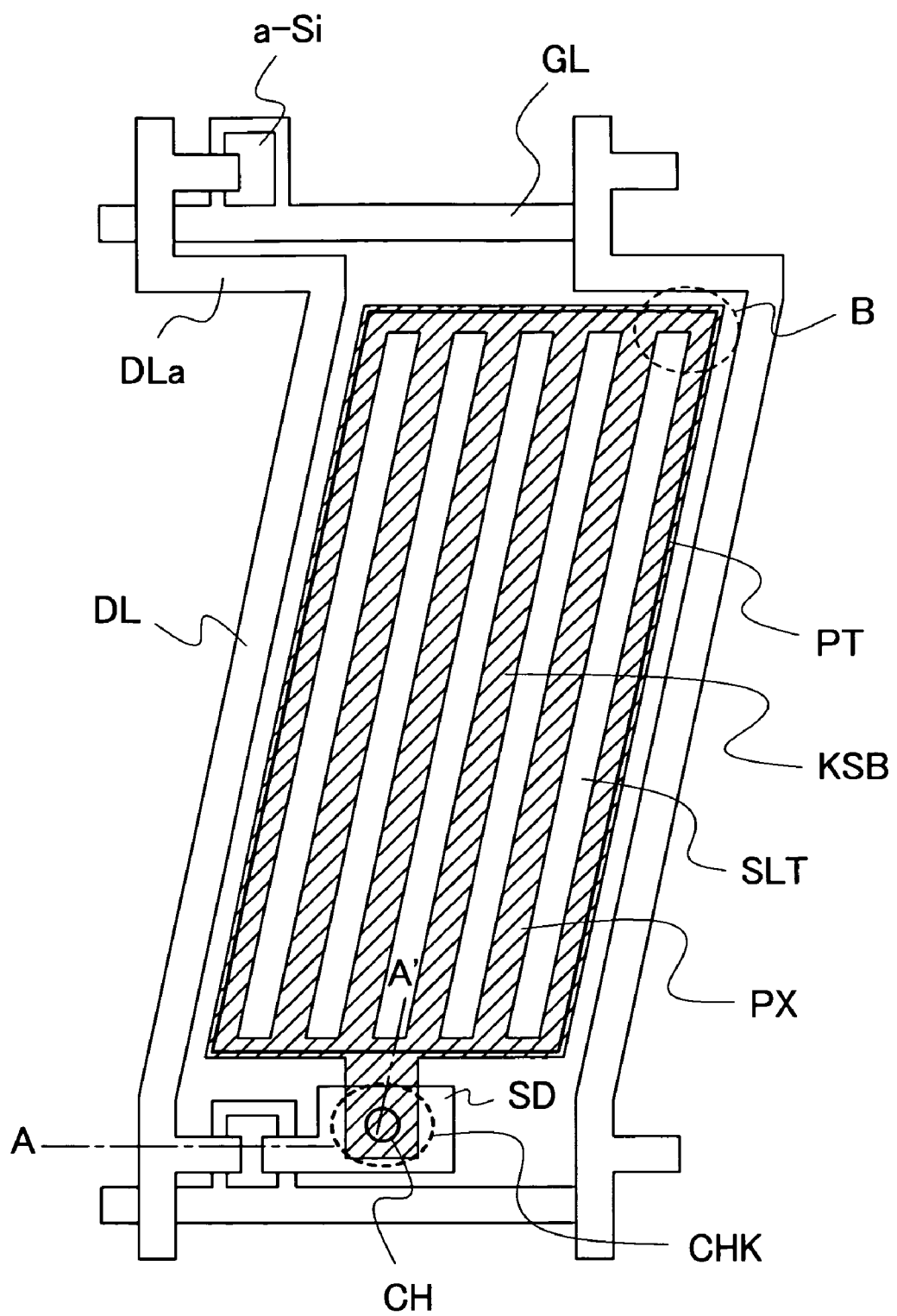
FIG. 2 is a schematic plan view for explaining the electrode structure of the liquid crystal display panel according to the embodiment 1 of the present invention.

FIG. 2 is a schematic plan view for explaining the electrode structure of the liquid crystal display panel according to the embodiment 1 of the present invention. As shown in FIG. 2, in this embodiment, the pixel has the single domain structure and hence, the linear portions of the pixel electrodes (PX) extend in one direction. Further, the linear portions of the pixel electrode (PX) are, different from the structure of the related art shown in FIG. 14, inclined with respect to the upper and lower directions of the drawing. Further, corresponding to the inclination of the linear portions of the pixel electrode (PX), video lines (DL) are also inclined. Further, to ensure linearity of the pixel arrangement, the video line (DL) has a fold-back portion (DLa), wherein the fold-back portion (DLa) and the inclined portion of the video line (DL) forms a shape of numeral "7". In FIG. 2, symbol a-Si indicates a semiconductor layer, symbol CH indicates a contact hole for connecting a conductive layer (SD) which functions as a source electrode and the pixel electrode (PX), and symbol CHK indicates an opening portion formed in a counter electrode. Although the counter electrode is formed in a planar shape below and over the whole region of the pixel electrode (PX) such that the counter electrode also covers video lines (DL) and the like except for the opening portion (CHK), the counter electrode is omitted from FIG. 2.

Here, the video line (DL) extends in a partially inclined or bent manner, that is, in a locally bent manner. However, when the video line (DL) is viewed as a whole, the video line (DL) extends in the first direction (in the direction along short sides 11-1 of the display region (AR)). Further, the scanning lines (GL) extend in the second direction (in the direction along long sides 11-2 of the display region (AR)).

Figure 3:
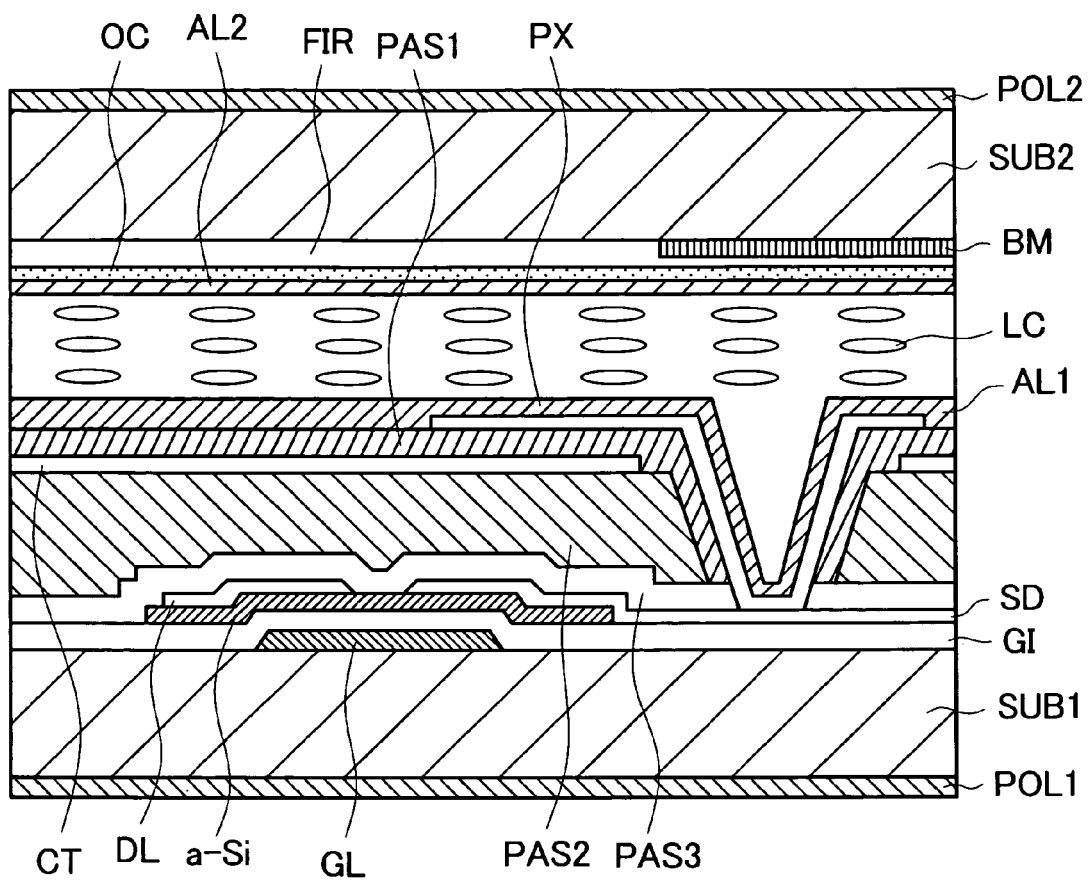
FIG. 3 is a cross-sectional view of an essential part showing the schematic cross-sectional structure of one sub pixel of a liquid crystal display device according to the embodiment 1 of the present invention.

FIG. 3 is a cross-sectional view of an essential part showing the schematic cross-sectional structure of one sub pixel of the liquid crystal display device of this embodiment. Here, FIG. 3 is a cross-sectional view showing the cross-sectional structure taken along a line A-A' in FIG. 2.

The liquid crystal display device of this embodiment includes a first substrate (SUB1; also referred to as a TFT substrate) and a second substrate (SUB2; also referred to as a counter substrate) which sandwich a liquid crystal layer (LC) made of positive liquid crystal therebetween. In the liquid crystal display device of this embodiment, a main surface side of the second substrate (SUB2) constitutes a viewing side.

As shown in FIG. 3, on a liquid-crystal-layer side of the first substrate (SUB1), in order from the first substrate (SUB1) to the liquid crystal layer (LC), the scanning lines (also referred to as gate lines) (GL), a gate insulation film (GI), the semiconductor layers (a-Si), conductive layers (SD) which function as the video lines (also referred to as the drain lines) (DL) and source electrodes, an interlayer insulation film (PAS3), an interlayer insulation film (PAS2), the counter electrodes (CT; also referred to as common electrodes), an interlayer insulation film (PAS1), the pixel electrodes (PX), and a first alignment film (AL1) are formed. Here, a first polarizer (POL1) is arranged outside the first substrate (SUB1).

Further, a thin film transistor (TFT) is constituted of a portion of the scanning line (GL) (gate electrode), the gate insulation film (GI), the semiconductor layer (a-Si), a portion of the video line (DL) (drain electrode) and the conductive layer (source electrode) (SD).

On the liquid-crystal-layer side of the second substrate (SUB2), in order from the second substrate (SUB2) to the liquid crystal layer (LC), a black matrix (light blocking film) (BM), color filters of red, green and blue (FIR), a leveling film (OC), and a second alignment film (AL2) are formed. Here, a second polarizer (POL2) is arranged outside the second substrate (SUB2).

Figure 14A:
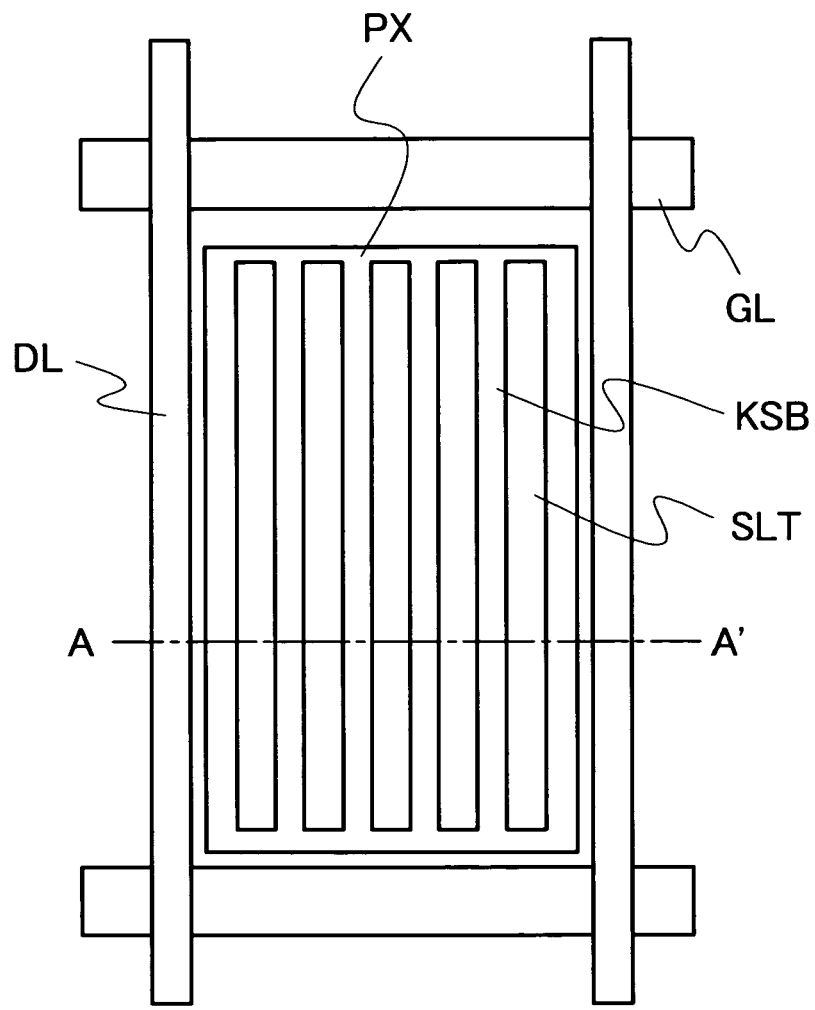
FIG. 14 is a view for explaining one example of the electrode structure of a conventional liquid crystal display panel adopting an IPS method.
Figure 14B:
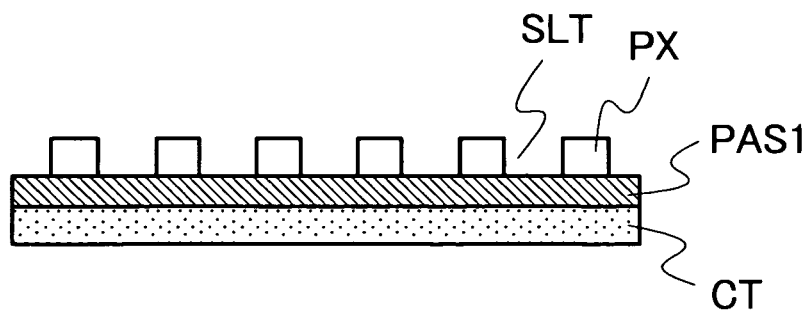

Further, the electrode structure of this embodiment is substantially equal to the previously-mentioned electrode structure shown in FIG. 14, wherein the counter electrode (CT) is formed in a planar shape, and the pixel electrode (PX) is formed of an electrode having a plurality of slits (SLT). Portions divided by the slits (SLT) formed in the pixel electrode (PX) constitute linear portions (comb-teeth electrode) (KSB) Although both ends of the slit (SLT) are closed in FIG. 2, one end of the slit (SLT) may be opened.

In general, the pixel electrodes (PX) and the counter electrodes (CT) are formed of a transparent conductive film made of ITO (Indium Tin Oxide) or the like, for example. Further, the pixel electrode (PX) and the counter electrode (CT) overlap with each other by way of the interlayer insulation film (PAS1) thus forming a holding capacitance. The interlayer insulation film (PAS1) may not be limited to the one-layered structure but may be two-or-more-layered structure.

Further, as shown in FIG. 2, one sub pixel is formed within a region having a parallelogram shape surrounded by the scanning lines (GL) and the video lines (DL). Since the region in which one sub pixel is formed is shielded from light by the black matrix (BM) formed on a second substrate (SUB2) side, a region (PT) which substantially functions as a region for forming one sub pixel becomes an opening portion formed in the black matrix (BM) (indicated by a bold line in FIG. 2).

In the liquid crystal display device of this embodiment, the pixel electrode (PX) having the linear portions and the planar counter electrode (CT) are stacked to each other by way of the interlayer insulation film (PAS1), and arcuate lines of electric force which are formed between the pixel electrode (PX) and the counter electrode (CT) are distributed over the liquid crystal layer (LC) in a penetrating manner thus changing the alignment of the liquid crystal layer (LC). That is, both of the pixel electrodes (PX) and the counter electrodes (CT) are formed on the same substrate and liquid crystal is driven by generating an electric fields due to the difference in potential between the pixel electrodes (PX) and the counter electrodes (CT).

[Technical Matter which Constitutes Premise of the Present Invention]

The liquid crystal display panel of the present invention can be acquired on a premise that the following relationships are satisfied with respect to absorption axes of the polarizers, alignment axes of the alignment films and the like.

(I-1)

The absorption axis of the second polarizer (POL2) and the absorption axis of the first polarizer (POL1) intersect each other orthogonally within an error range of ±1°.

(I-2)

The Alignment Axis of the Second Alignment Film (AL2) and the alignment axis of the first alignment film (AL1) are arranged parallel to each other within an error range of ±2°.

(I-3)

The Absorption Axis of the Second Polarizer (POL2) and the alignment axis of the second alignment film (AL2) are arranged parallel to each other or intersect each other orthogonally within an error range of ±2°.

(I-4)

The Linear Portions of the Pixel Electrode (PX) Extend in an inclined manner with respect to the alignment axis of the second alignment film (AL2) by a pre-twist angle, and an absolute value of the pre-twist angle is set to a value which falls within a range from 0 to 20° (desirably a value which falls within a range from 50 to 15°) in case of positive liquid crystal, and is set to a value which falls within a range from 70° to 90° (desirably a value which falls within a range from 75° to 85°) in case of negative liquid crystal.

Under such conditions which constitute the premise of the present invention, for setting the absorption axis of the second polarizer (POL2) to a value which falls within a range from 10° to 80° or within a range from −10° to −80° displaced from 0° and 90° by 10° or more, and desirably a value which falls within a range from 30° to 60° or within a range from −30° to −60° displaced from 0° and 90° by 30° or more, the pixel structure which inclines only the linear portions of the pixel electrode (PX) may be considered. Such electrode structure is shown in FIG. 18.

Here, 0° is the extension direction of the video lines (DL), 90° is the direction orthogonal to the extension direction of the video lines (DL), and the angle is an angle measured from 0° in the clockwise. Further, FIG. 18 is a view showing the electrode structure of the liquid crystal display panel of a reference example of the present invention.

Figure 18:
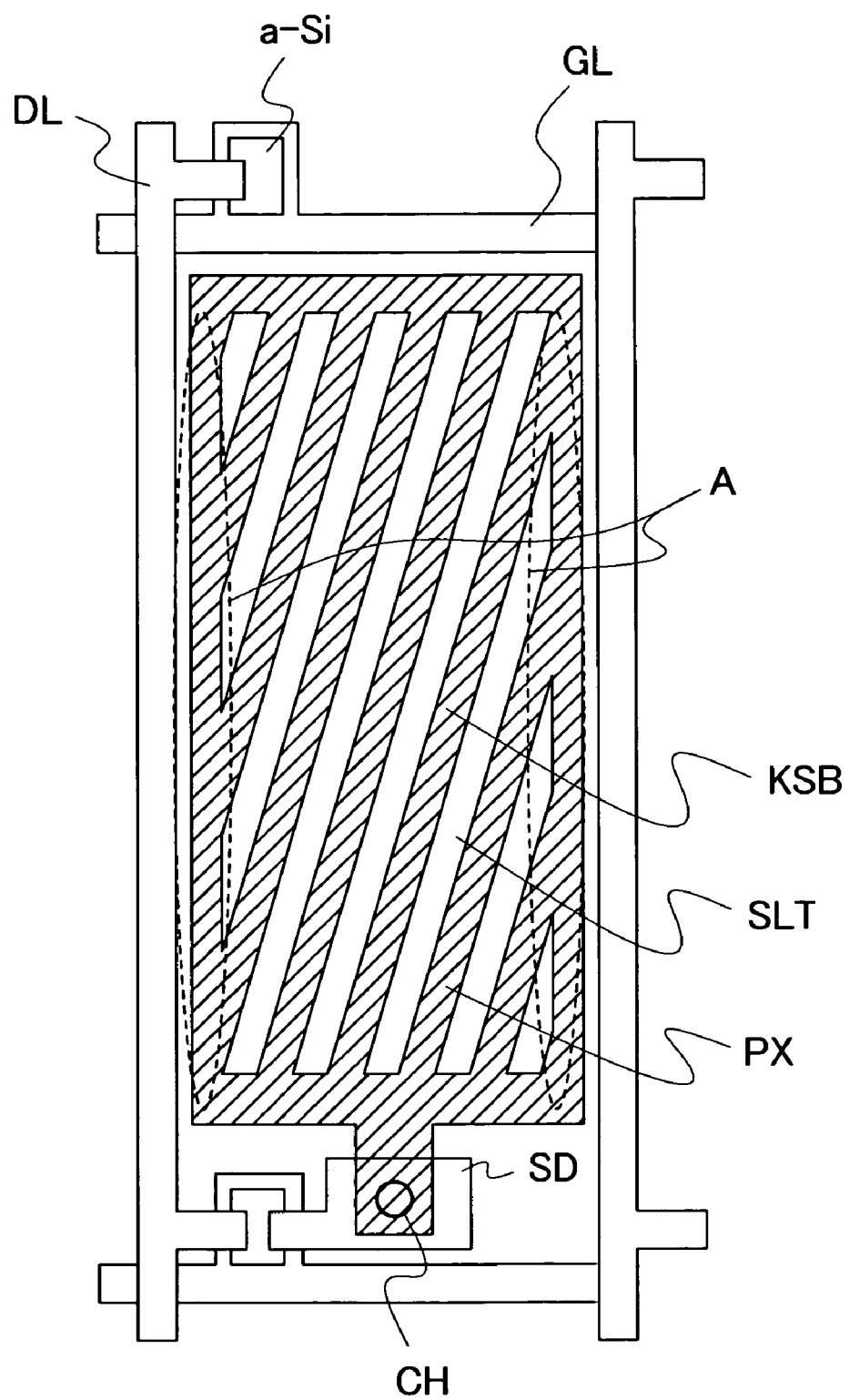
FIG. 18 is a view showing the electrode structure of a liquid crystal display panel of a reference example of the present invention.

In the electrode structure shown in FIG. 18, the extension direction of the linear portions (KSB) of the pixel electrode (PX) takes an angle which makes the extension direction of the linear portions (KSB) of the pixel electrode (PX) different from the extension direction of the video lines (DL) or the extension direction of the scanning lines (GL). Accordingly, there arises a drawback that, with respect to one sub pixel, an electric field for driving liquid crystal becomes non-uniform on portions of such a sub pixel on both sides of the video line (DL) and hence, an invalid region attributed to an undesired electric field (a region surrounded by a dotted line and indicated by A in FIG. 18) is increased whereby a drawback such as lowering of transmissivity is easily induced.

Figure 4:
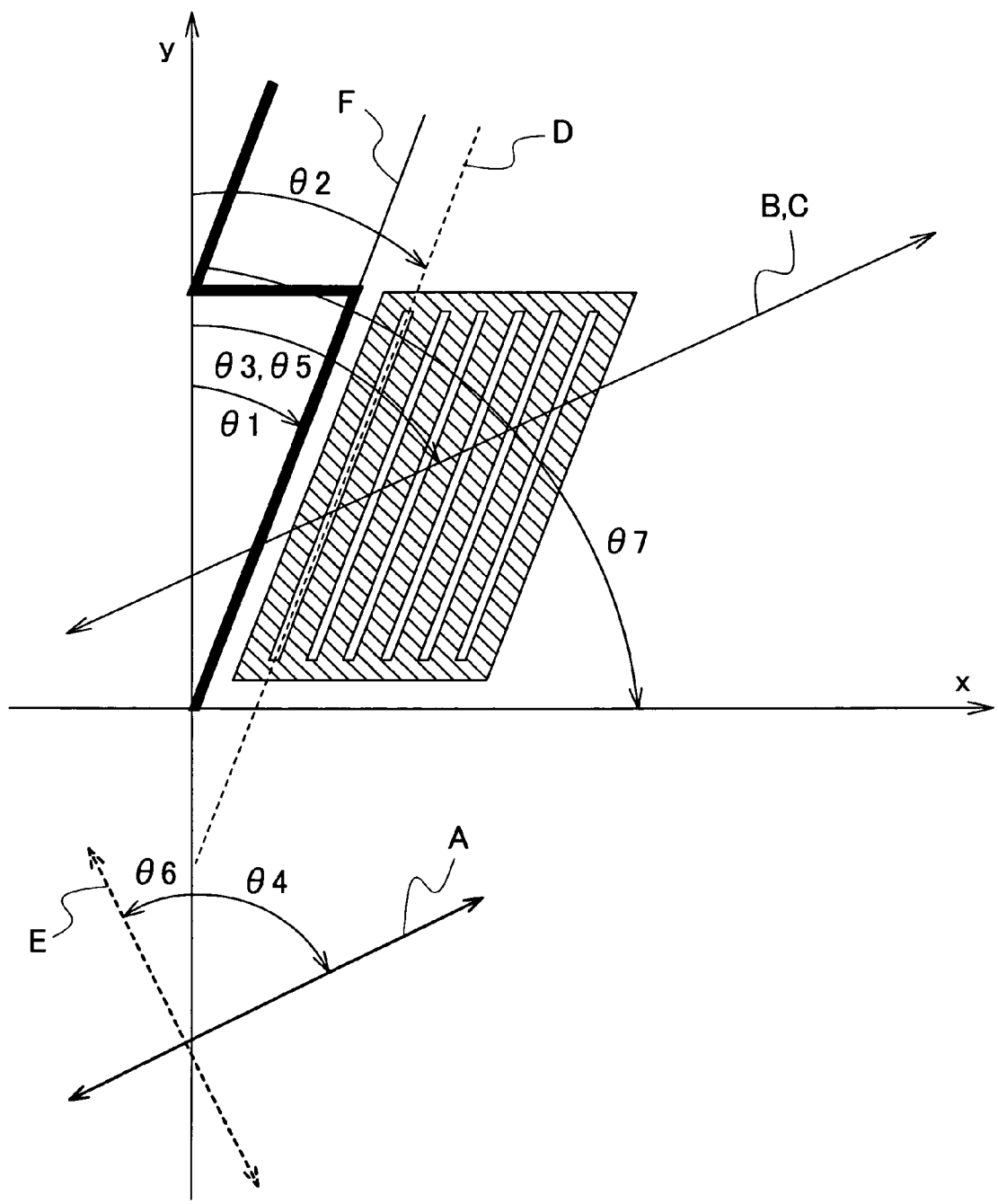
FIG. 4 is a view for explaining one example of a relationship between linear portions of a pixel electrode and alignment axes of first and second alignment films in the liquid crystal display panel according to the embodiment 1 of the present invention.

Hereinafter, a relationship between the linear portions of the pixel electrode (PX) and the alignment axes of the first and second alignment films with respect to the liquid crystal display panel of this embodiment is explained in conjunction with FIG. 4. A y-axis direction in FIG. 4 is the first direction (y) (in the direction along short sides 11-1 of the display region (AR)), and an x-axis direction in FIG. 4 is the second direction (x) (in the direction along long sides 11-2 of the display region (AR)).

In this embodiment, the following relationships are satisfied. Here, the first direction (y) is used as the reference direction, and when an angle is measured from the reference direction, the measurement is performed within a range from −90° to +90° while setting the clockwise direction from the reference direction as the normal direction.

(II-1)

Assuming an angle which is a narrow-side angle out of intersection angles between the first direction (y) and the absorption axis (A in FIG. 4) of the second polarizer (POL2) and is measured in the clockwise direction from the first direction (y) as θ4, |θ4| is set to a value which falls within a range from 10° to 80°, desirably a value which falls within a range from 30° to 60°. FIG. 4 shows a case in which an angle θ4 is set in the positive direction.

(II-2)

Based on the Above-Mentioned Conditions (II-1) and (I-3), assuming an angle which is a narrow-side angle out of intersection angles between the first direction (y) and the alignment axis (B in FIG. 4) of the second alignment film (AL2) and is measured in the clockwise direction from the first direction (y) as θ3, since the alignment axis of the second alignment film (AL2) is approximately parallel to or approximately orthogonal to (however, within an error range of ±2°) the absorption axis of the second polarizer (POL2), |θ3| is set to a value which falls within a range from 10° to 80°, desirably a value which falls within a range from 30° to 60° (error being ignored for the sake of convenience). In FIG. 4, the alignment axis of the second alignment film (AL2) and the absorption axis of the second polarizer (POL2) are set parallel to each other.

Here, the state that the alignment axis of the second alignment film (AL2) is approximately parallel to the absorption axis of the second polarizer (POL2) (however, within an error range of ±2°) implies that the relationship of $0 \leq |θ3−θ4| \leq 2°$ is satisfied. The state that the alignment axis of the second alignment film (AL2) and the absorption axis of the second polarizer (POL2) are arranged orthogonal to each other (however, within an error range of ±2°) implies that the relationship of $88° \leq |θ3−θ4| \leq 92°$ is satisfied.

(II-3)

Assuming an angle which is a narrow-side angle out of intersection angles between the first direction (y) and the extension direction of the linear portions of the pixel electrode (PX) (D in FIG. 4) and is measured in the clockwise direction from the first direction (y) as θ2, the angles θ2 become an angle which satisfies the pre-twist angle which is the condition set in (I-4). Accordingly, the angles θ2, θ3 are set to have the same sign (positive or negative). In case of FIG. 4, both of the angles θ2, θ3 have the positive sign. In this manner, assuming that the pre-twist angle takes a value which falls within a range from −20° to 20°, a relationship of $0° \leq |θ3-θ2| \leq 20°$ is established. Here, as the relationship which satisfies the condition set in (I-4), two relationships, that is, the relationships of $|θ3| \leq |θ2|$ and the relationships of $|θ2| \leq |θ3|$ are considered. By adopting the relationships of $|θ2| \leq |θ3|$, it is possible to set |θ3| to a value equal to or more than an absolute value of the pre-twist angle without largely increasing |θ2|. Accordingly, in FIG. 4, the relationship of $|θ2| \leq |θ3|$ is adopted. When |θ2| is excessively small, the pixel electrode (PX) exhibits no substantial difference compared to the conventional pixel electrode (PX) in constitution and hence, the angle θ2 is set to satisfy the relationship of $10° \leq |θ2|$.

(II-4)

To Obviate the Drawback Attributed to the Invalid Region shown in FIG. 18, a portion of the video lines (DL) is locally inclined to become parallel to the extension direction of the linear portions of the pixel electrode (PX) within an error range of ±2°.

That is, assuming a narrow-side angle out of intersection angles between the first direction (y) and the extension direction (F in the drawing) of the portion of the video lines (DL) and is measured in the clockwise direction from the first direction (y) as θ1, the angles θ1, θ2 are set to have the same sign (positive or negative) (being positive in the case shown in FIG. 4) and, at the same time, the angles θ1, θ2 are set to satisfy a relationship of $0° \leq |θ1-θ2| \leq 2°$. Due to the condition set in (II-3), the angle θ2 is set to satisfy the relationship of $10° \leq |θ2|$, the angle θ1 is set to satisfy the relationship of $10° \leq |θ1|$ in the same manner. However, the excessive inclination of the video lines (DL) makes waste in a layout of the pixels and hence, the angle θ1 is desirably set to satisfy a relationship of $10° \leq |θ1| \leq 45°$. It is more desirable to set the angle θ1 to a value which satisfies a relationship of $10° \leq |θ1| \leq 30°$.

(II-5)

Based on the Conditions Set in (II-3) and (II-4), all of a sign of the angle θ1, a sign of the angle θ2 and a sign of the angle θ3 become equal in one sub pixel. Further, to establish the above-mentioned constitution in all sub pixels, the angles θ1 (rotational direction of θ1) of all sub pixels have the same sign.

Accordingly, with respect to the structure of the sub pixel, as described previously, the sub pixel is inclined to form a parallelogram, and all sub pixels are inclined in the same direction (that is, all sub pixels being inclined toward a right side or a left side).

Further, assuming an angle which is a narrow-side angle out of intersection angles between the first direction (y) and the alignment axis (C in FIG. 4) of the first alignment film (AL1) and is measured in the clockwise direction from the first direction (y) as θ5, and assuming an angle which is a narrow-side angle out of intersection angles between the first direction (y) and the absorption axis (E in FIG. 4) of the first polarizer (POL1) and is measured in the clockwise direction from the first direction (y) as θ6, based on the conditions set in (I-1) and (I-2), a relationship of $0° \leq |θ3-θ5| \leq 2°$ and a relationship of $89° \leq |θ4-θ6| \leq 91°$ are satisfied. In the case shown in FIG. 4, the angle θ4 takes a positive value and hence, the angle θ6 takes a negative value.

Here, when the alignment axis of the second alignment film (AL2) is arranged approximately orthogonal to the absorption axis of the second polarizer (POL2) (within an error range of ±2°), in FIG. 4, it is sufficient to exchange A and E and the above-mentioned relationships are directly established. In this case, the angle θ4 takes a negative value and the angle θ6 takes a positive value.

Figure 5:
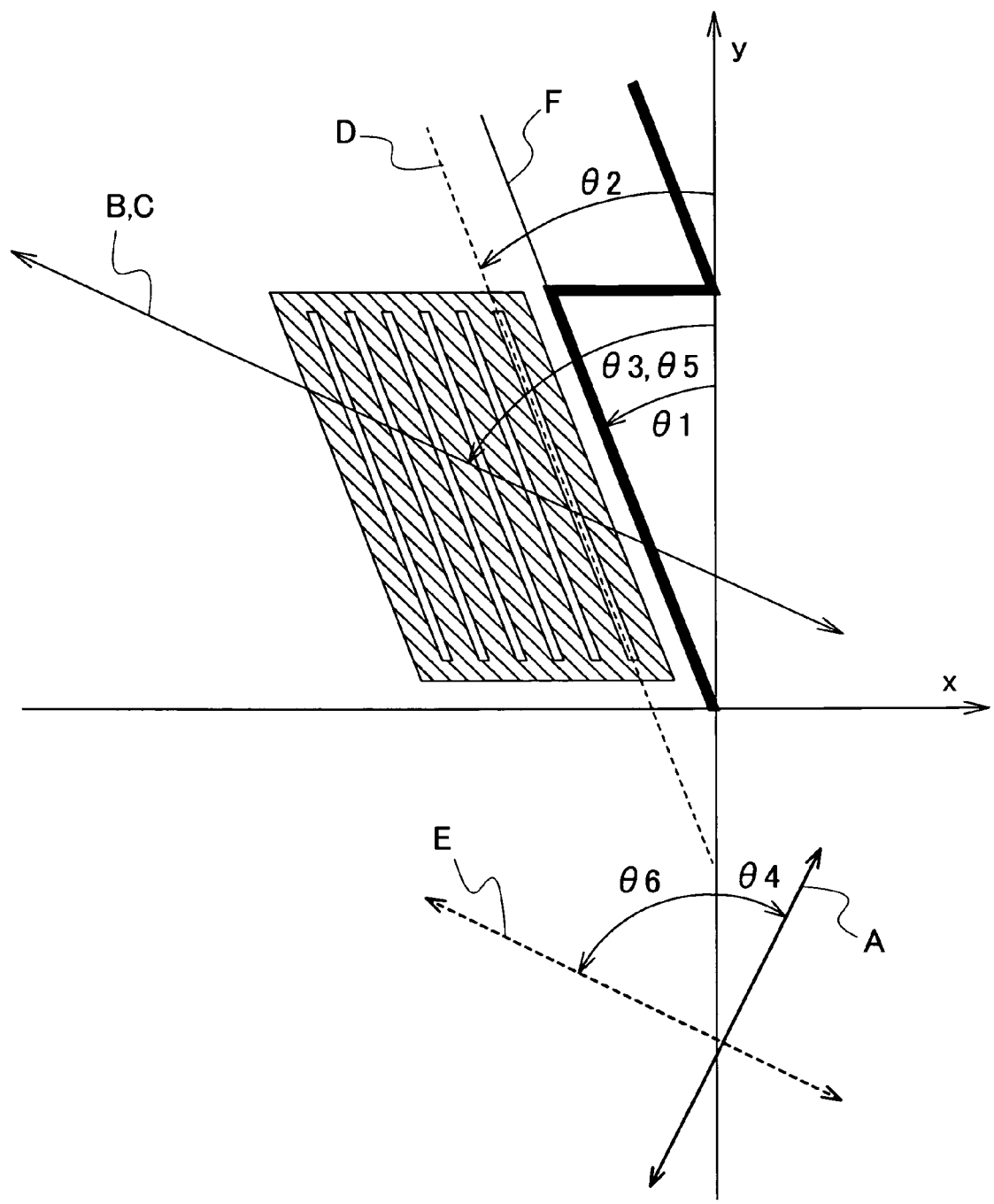
FIG. 5 is a view for explaining another example of a relationship between linear portions of a pixel electrode and alignment axes of first and second alignment films in the liquid crystal display panel according to the embodiment 1 of the present invention.

As shown in FIG. 5, the inclination direction of the pixel may be set opposite to the inclination direction of the pixel shown in FIG. 4. It is defined that the angle takes a negative value when the angle is measured in the counterclockwise direction from the reference direction and hence, also in this case, the sign of the angle θ1, the sign of the angle θ2 and the sign of the angle θ3 have the same sign (negative) and, at the same time, the above-mentioned relationships with respect to the angles θ1 to θ6 are established. Further, FIG. 5 illustrates the case in which the alignment axis (B in FIG. 5) of the second alignment film (AL2) is arranged approximately orthogonal to the absorption axis (A in FIG. 5) of the second polarizer (POL2) (within an error range of ±2). It is needless to say that when the alignment axis (B in FIG. 5) of the second alignment film (AL2) is arranged approximately parallel to the absorption axis (A in FIG. 5) of the second polarizer (POL2) (within an error range of ±2°), it is sufficient to exchange A and E in FIG. 5.

Accordingly, by assuming the clockwise direction as the normal direction based on the first direction (y), and by measuring the angles θ1 to θ6 within a range from −90° to +90°, the angles θ1 to θ6 can be generalized into following formulae (1).

$$(1)\ 10° \leq |θ1| \leq |θ3|\ \text{and}\ 10° \leq |θ2| \leq |θ3|$$

$$(2)\ 0° \leq |θ3-θ2| \leq 20°$$

$$(3)\ 0° \leq |θ1-θ2| \leq 2°$$

$$(4)\ 10° \leq |θ3| \leq 80°\ (\text{desirably}\ 30° \leq |θ3| \leq 60°)$$

$$(5)\ 0° \leq |θ3-θ4| \leq 2°\ \text{or}\ 88° \leq |θ3θ4| \leq 92°$$

$$(6)\ 0° \leq |θ3-θ5| \leq 2°$$

$$(7)\ 89° \leq |θ4-θ6| \leq 91° \qquad (1)$$

Further, all of a sign of the angle θ1, a sign of the angle θ2 and a sign of the angle θ3 are equal in one sub pixel. Further, the angles θ1 of all sub pixels have the same sign.

Figure 6:
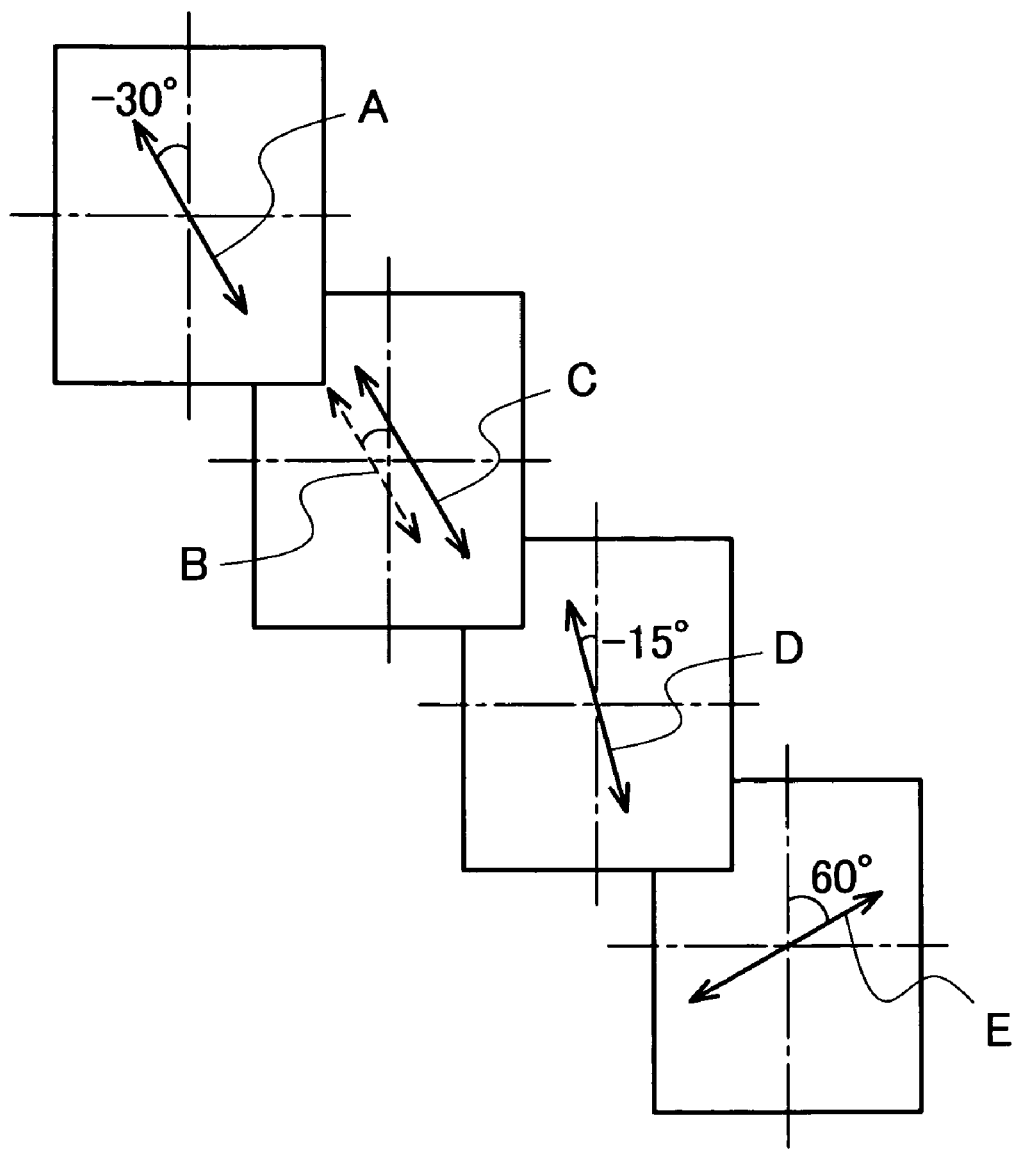
FIG. 6 is a view showing one example of a relationship among an absorption axis of a second polarizer, an alignment axis of a second alignment film, an extension direction of linear portions of a pixel electrode, an alignment axis of a first alignment film, and an absorption axis of a first polarizer in the liquid crystal display panel according to the embodiment 1 of the present invention.

FIG. 6 shows one example of a relationship among the absorption axis of the second polarizer (POL2), the alignment axis of the second alignment film (AL2), the extension direction of the linear portions of the pixel electrode (PX), the alignment axis of the first alignment film (AL1), and the absorption axis of the first polarizer (POL1) in the liquid crystal display panel of this embodiment. Although the numerical values in the example shown in FIG. 6 are not equal to the numerical values in the examples shown in FIG. 4 and FIG. 5, these numerical values fall within a numerical value range which satisfies the conditions explained in conjunction with this embodiment.

Figure 16:
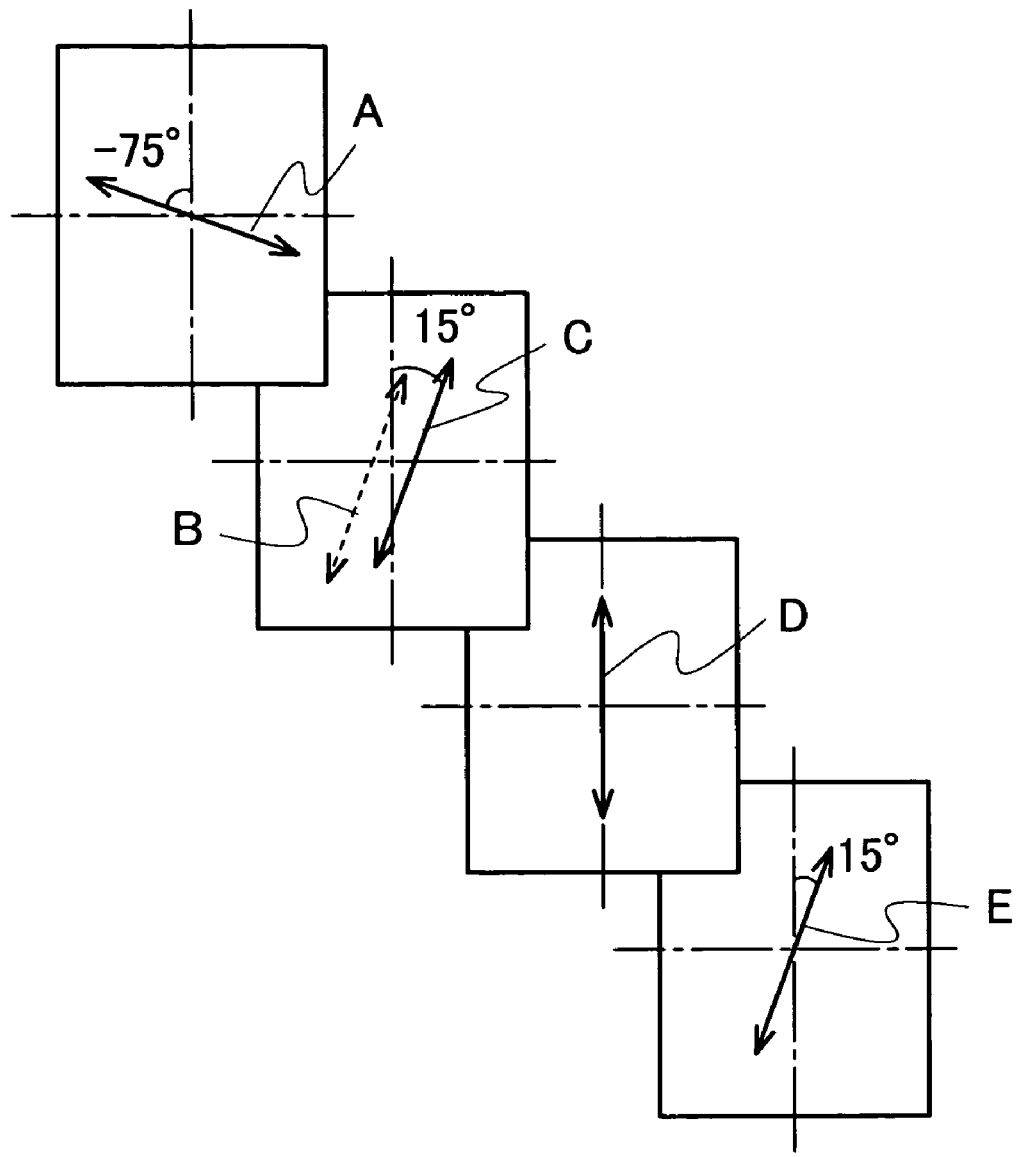
FIG. 16 is a view showing one example of a relationship among an absorption axis of a second polarizer, an alignment axis of a second alignment film, an extension direction of linear portions of a pixel electrode, an alignment axis of a first alignment film, and an absorption axis of a first polarizer in the conventional liquid crystal display panel adopting an IPS method.

Further, FIG. 16 shows one example of a relationship among an absorption axis of a second polarizer (POL2), an alignment axis of a second alignment film (AL2), an extension direction of linear portions of a pixel electrode (PX), an alignment axis of a first alignment film (AL1), and an absorption axis of a first polarizer (POL1) in the conventional liquid crystal display panel adopting an IPS method.

Figure 15:
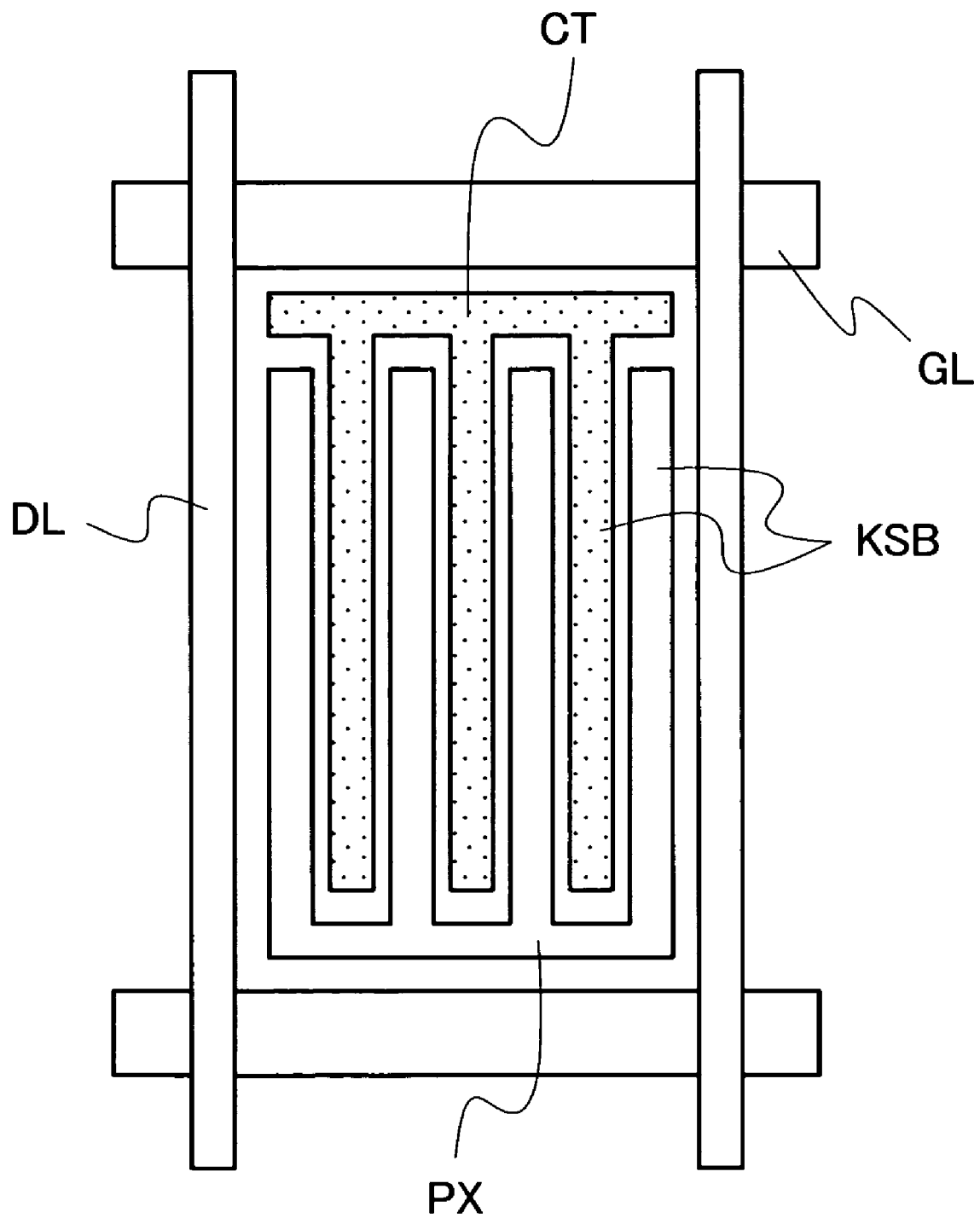
FIG. 15 is a plan view for explaining another example of the electrode structure of the conventional liquid crystal display panel adopting an IPS method.

FIG. 6 and FIG. 16 show the relationship among the absorption axis of the second polarizer (POL2), the alignment axis of the second alignment film (AL2), the extension direction of the linear portions of the pixel electrode (PX), the alignment axis of the first alignment film (AL1), and the absorption axis of the first polarizer (POL1) in the liquid crystal display panel adopting the above-mentioned electrode structure shown in FIG. 15. In the example shown in FIG. 6, the sub pixel is inclined in accordance with the relationships shown in FIG. 4 and FIG. 5.

In FIG. 6, FIG. 16, and FIG. 7, FIG. 17 described later, symbol A indicates the absorption axis of the second polarizer (POL2), symbol B indicates the alignment axis of the second alignment film (AL2), symbol C indicates the alignment axis of the first alignment film (AL1), symbol D indicates the extension direction of the linear portions of the pixel electrode (PX), and symbol E indicates the absorption axis of the first polarizer (POL1).

In the example shown in FIG. 16, an absolute value of a pre-twist angle is set to 15°. Further, while an angle which is measured from the first direction (y) to the absorption axis of the second polarizer (POL2) in the clockwise direction is set to −75°, the extension direction of the linear portions of the pixel electrode (PX) is set to 0°. Accordingly, a magnitude of the inclination which contributes to overcoming of problems attributed to polarization sunglasses is 15° (not effective in overcoming of problems attributed to polarization sunglasses at 0° and maximum effect in overcoming of problems attributed to polarization sunglasses acquired at 45°).

To the contrary, although the absolute angle of the pre-twist angle is set to 15° in the example shown in FIG. 6 in the same manner as the example in FIG. 16, an angle which is measured from the first direction (y) to the absorption axis of the second polarizer (POL2) in the clockwise direction is set to −30°, and an angle from the first direction (y) to the extension direction of the linear portions of the pixel electrode (PX) is set to −15°. Accordingly, a magnitude of the inclination which contributes to the overcoming of problems attributed to polarization sunglasses becomes 30° and hence, the example shown in FIG. 6 is more effective than the example shown in FIG. 16 in overcoming problems attributed to polarization sunglasses in spite of a fact that the example shown in FIG. 6 and the example shown in FIG. 16 exhibit the same absolute value of the pre-twist angle.

Figure 7:
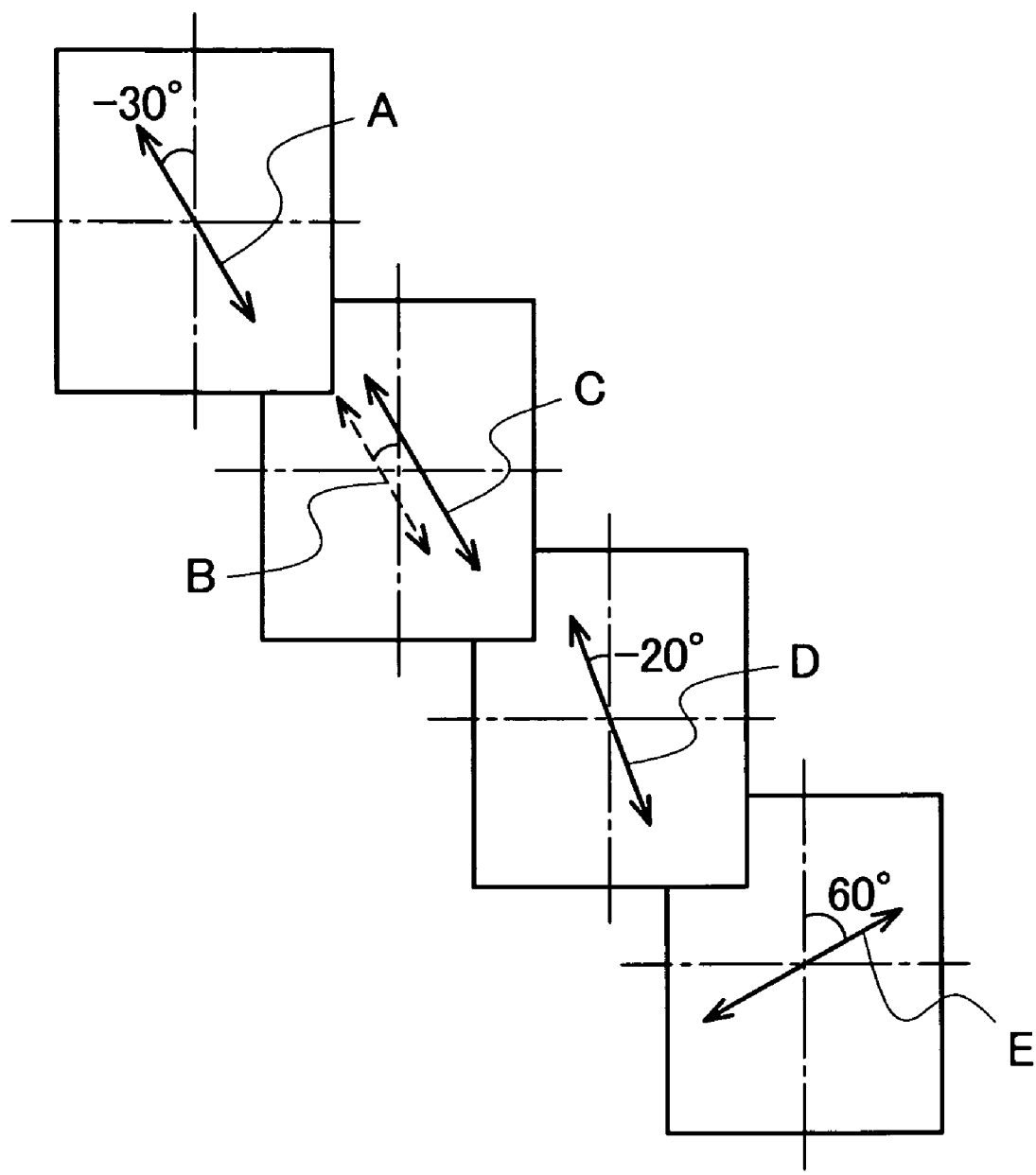
FIG. 7 is a view showing another example of a relationship among an absorption axis of a second polarizer, an alignment axis of a second alignment film, an extension direction of linear portions of a pixel electrode, an alignment axis of a first alignment film, and an absorption axis of a first polarizer in the liquid crystal display panel according to the embodiment 1 of the present invention.

FIG. 7 shows another example of a relationship among the absorption axis of the second polarizer (POL2), the alignment axis of the second alignment film (AL2), the extension direction of the linear portions of the pixel electrode (PX), the alignment axis of the first alignment film (AL1), and the absorption axis of the first polarizer (POL1) in the liquid crystal display panel of this embodiment. Here, although the example shown in FIG. 6 differs from the examples shown in FIG. 4 and FIG. 5 in to numerical values, the values in the example shown in FIG. 6 fall within a range which satisfies the conditions explained in conjunction with this embodiment.

Figure 17:
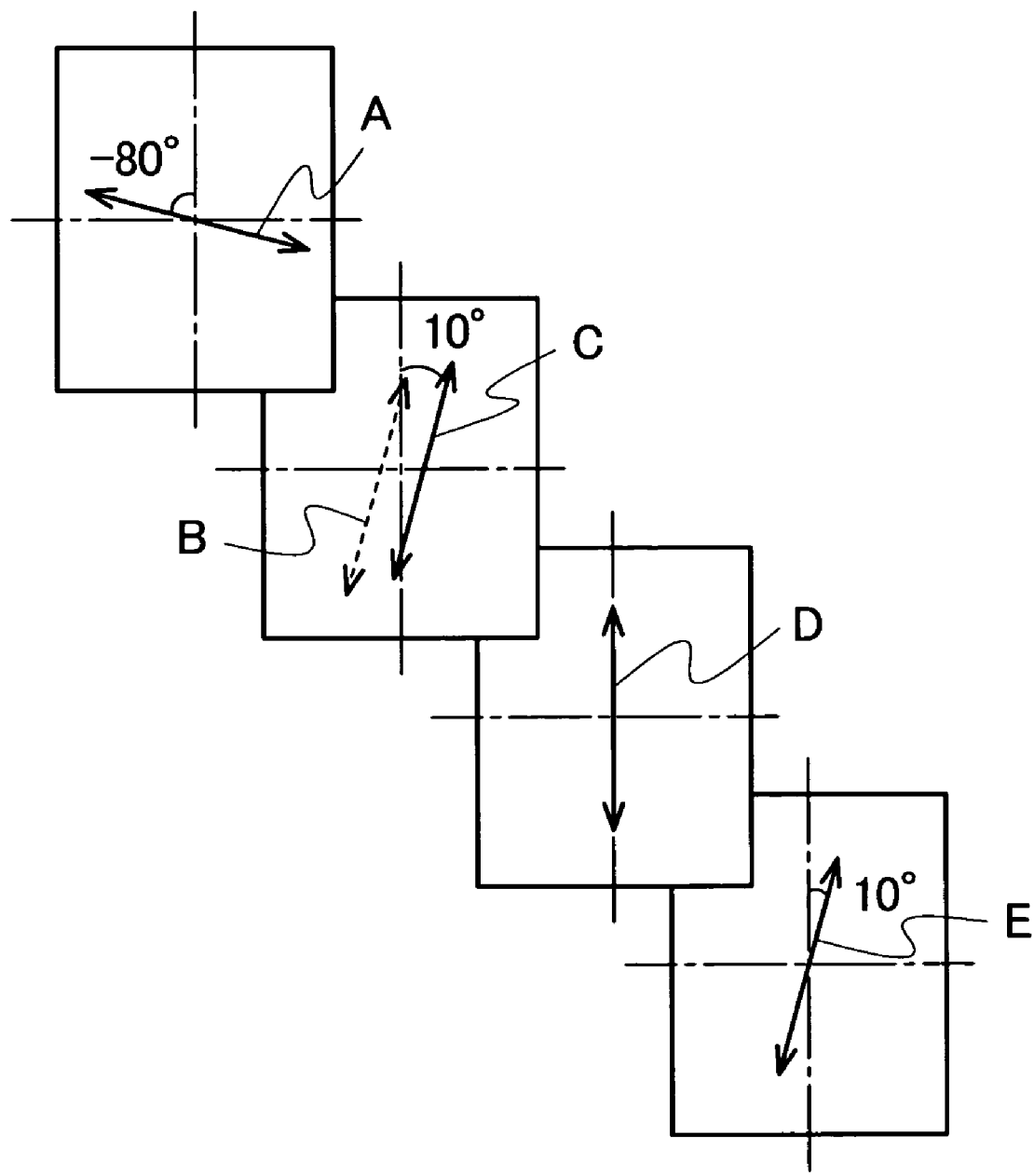
FIG. 17 is a view showing another example of a relationship among an absorption axis of a second polarizer, an alignment axis of a second alignment film, an extension direction of linear portions of a pixel electrode, an alignment axis of a first alignment film, and an absorption axis of a first polarizer in the conventional liquid crystal display panel adopting an IPS method.

Further, FIG. 17 shows another example of a relationship among an absorption axis of a second polarizer (POL2), an alignment axis of a second alignment film (AL2), an extension direction of linear portions of a pixel electrode (PX), an alignment axis of a first alignment film (AL1), and an absorption axis of a first polarizer (POL1) in the conventional liquid crystal display panel adopting an IPS method.

FIG. 7 and FIG. 17 show the relationship among the absorption axis of the second polarizer (POL2), the alignment axis of the second alignment film (AL2), the extension direction of the linear portions of the pixel electrode (PX), the alignment axis of the first alignment film (AL1), and the absorption axis of the first polarizer (POL1) in the liquid crystal display panel adopting the above-mentioned electrode structure shown in FIG. 14. In the example shown in FIG. 7, the sub pixel is inclined in accordance with the relationships shown in FIG. 4 and FIG. 5.

In the example shown in FIG. 17, an absolute value of a pre-twist angle is set to 10°. Further, while an angle which is measured from the first direction (y) to the absorption axis of the second polarizer (POL2) in the clockwise direction is set to −80°, the extension direction of the linear portions of the pixel electrode (PX) is set to 0°. Accordingly, a magnitude of the inclination which contributes to overcoming of problems attributed to polarization sunglasses is 10°.

To the contrary, although the absolute value of the pre-twist angle is set to 10° in the example shown in FIG. 7 in the same manner as the example in FIG. 17, an angle which is measured from the first direction (y) to the absorption axis of the second polarizer (POL2) in the clockwise direction is set to −30°, and an angle which is measured from the first direction (y) to the extension direction of the linear portions of the pixel electrode (PX) is set to −20°. Accordingly, a magnitude of the inclination which contributes to the overcoming of problems attributed to polarization sunglasses becomes 30° and hence, the example shown in FIG. 7 is more effective than the example shown in FIG. 17 in overcoming problems attributed to polarization sunglasses in spite of a fact that the example shown in FIG. 7 and the example shown in FIG. 17 exhibit the same absolute value of the pre-twist angle.

In this manner, the liquid crystal display panel of this embodiment largely differs from the conventional liquid crystal display panel with respect to a point that the video lines (DL) and the extension direction of the linear portions of the pixel electrode (PX) are inclined with respect to the first direction (y)

Modification 1 of Embodiment 1

When the liquid crystal layer (LC) adopts negative liquid crystal, formulae equal to the above-mentioned formulae (1) are established by changing the definition of the angle $\theta 3$.

That is, while a long-axis direction of the liquid crystal molecules is rotated in the direction toward an electric field in positive liquid crystal, the long-axis direction of the liquid crystal molecules is rotated in the direction away from an electric field in negative liquid crystal. Accordingly, in place of the above-mentioned angle $\theta 3$, as shown in FIG. 8, an angle $\Theta 3$ which is a narrow-side angle out of intersection angles between the first direction (y) and a direction (G in FIG. 8) orthogonal to the alignment axis (B in FIG. 8) of the second alignment film (AL2) and is measured in the clockwise direction is used.

Figure 8:
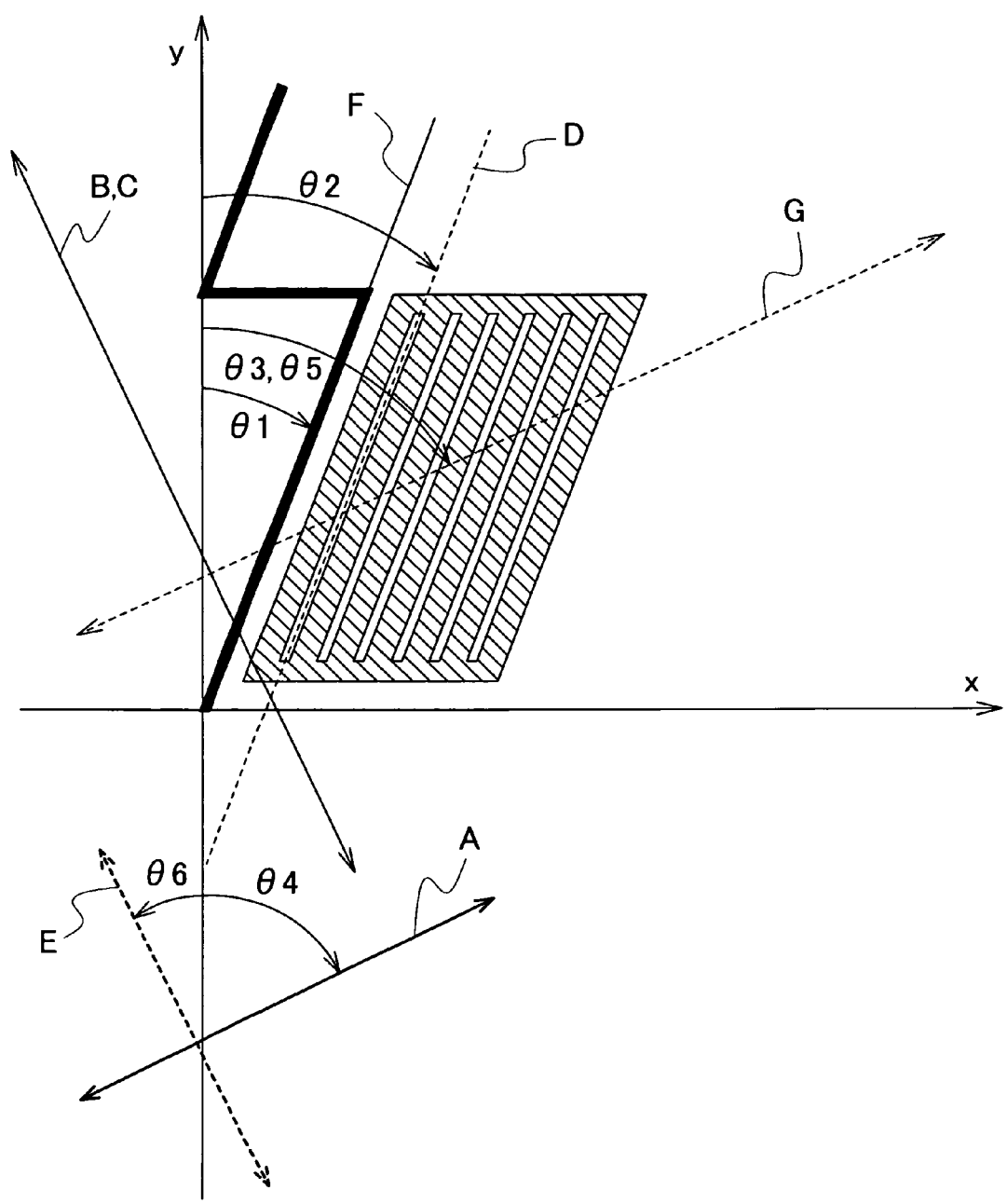
FIG. 8 is a view for explaining an angle from a first direction to a direction orthogonal to the alignment axis of the second alignment film when a liquid crystal layer is made of negative liquid crystal in the liquid crystal display panel according to the embodiment 1 of the present invention.

In the same manner, in place of the above-mentioned angle $\theta 5$, as shown in FIG. 8, an angle $\Theta 5$ which is a narrow-side angle out of intersection angles between the first direction (y) and a direction (G in FIG. 8) orthogonal to the alignment axis (C in FIG. 8) of the first alignment film (AL1) and is measured in the clockwise direction from the first direction (y) is used.

Here, the angle $\Theta 3$ and the angle $\Theta 5$ are also measured within a range from −90° to +90°.

Accordingly, the above-mentioned formulae (1) are expressed by the following formulae (2).

(1) $10° \leq |\theta 1| \leq |\theta 3|$ and $10° \leq |\theta 2| \leq |\Theta 3|$ (2) $0° \leq |\Theta 3 - \theta 2| \leq 20°$ (4) $10° \leq |\Theta 3| \leq 80°$ (desirably $30° \leq |\Theta 3| \leq 60°$)

(5) $0°\leq|\Theta3-\Theta4|\leq2°$, or $88°\leq|\Theta-\Theta4|\leq92°$ (6) $0°\leq|\Theta3-\Theta5|\leq2°$ (7) $89°\leq|\Theta4-\Theta6|\leq91°$     (2)

Further, all of a sign of the angle θ1, a sign of the angle θ2 and a sign of the angle Θ3 are equal in one sub pixel. Further, the angles θ1 of all sub pixels have the same sign.

Modification 2 of Embodiment 1

Figure 9:
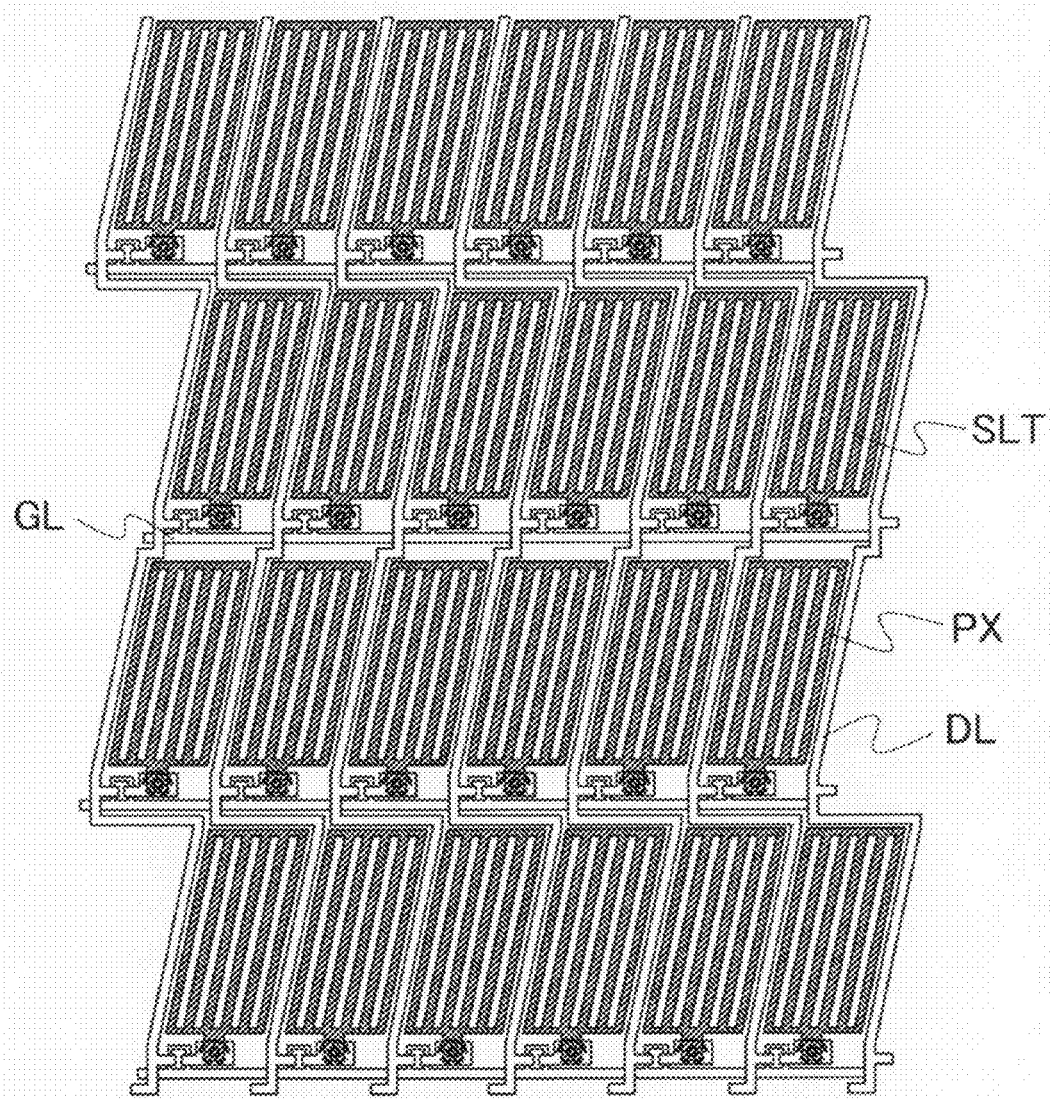
FIG. 9 is a view for explaining the pixel arrangement which adopts the delta arrangement.

As shown in FIG. 9, the known delta arrangement is adopted by this modification 2 as the pixel arrangement. In this delta arrangement, when the angle |θ1| is increased, a region where the same color continuously appears obliquely is formed. Accordingly, it is desirable to set the angle |θ1| to satisfy the relationship of |θ1|≦15°.

Further, in FIG. 2, scanning lines (GL) is arranged orthogonal to (within an error range of ±2°) the first direction (y). That is, as shown in FIG. 4, assuming an angle which is a narrow-side angle out of intersection angles between the first direction (y) and the extension direction of the scanning line (GL) and is measured in the clockwise direction from the first direction (y) as θ7, the relationship of 88°≦|θ7|≦90° is satisfied.

Figure 10:
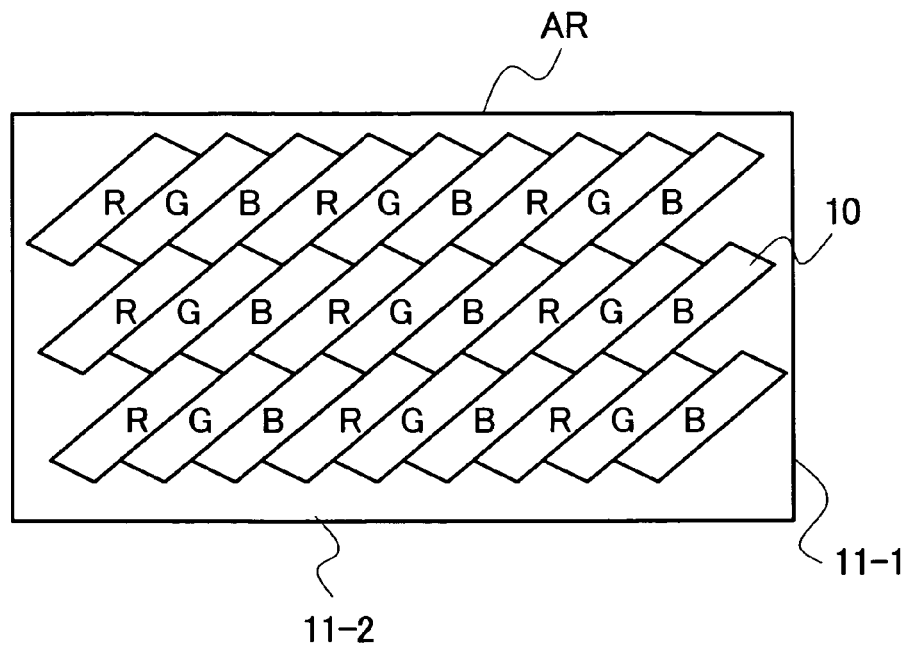
FIG. 10 is a schematic view showing another example of the pixel arrangement of the liquid crystal display panel according to the embodiment 1 of the present invention.

However, with respect to the direction of an electric field in a region indicated by B in FIG. 2, different from the directions of electric fields in other regions in the sub pixel, an invalid region attributed to an undesired electric field is increased thus easily giving rise to drawbacks such as lowering of transmissivity. To cope with such a drawback, as shown in FIG. 10, a portion of the scanning lines (GL) may be also bent. In this case, the scanning lines (GL) extend in the second direction (x) which intersects the first direction (y) as a whole while being bent locally (within an error range of ±2°), and an angle which is a narrow-side angle out of intersection angles between the first direction (y) and the extension direction of the portion of the scanning lines (GL) and is measured in the clockwise direction from the first direction (y) is set to θ7. Further, the angle θ7 desirably satisfies the relationship of 45°≦|θ7|≦90°.

Embodiment 2

Figure 11:
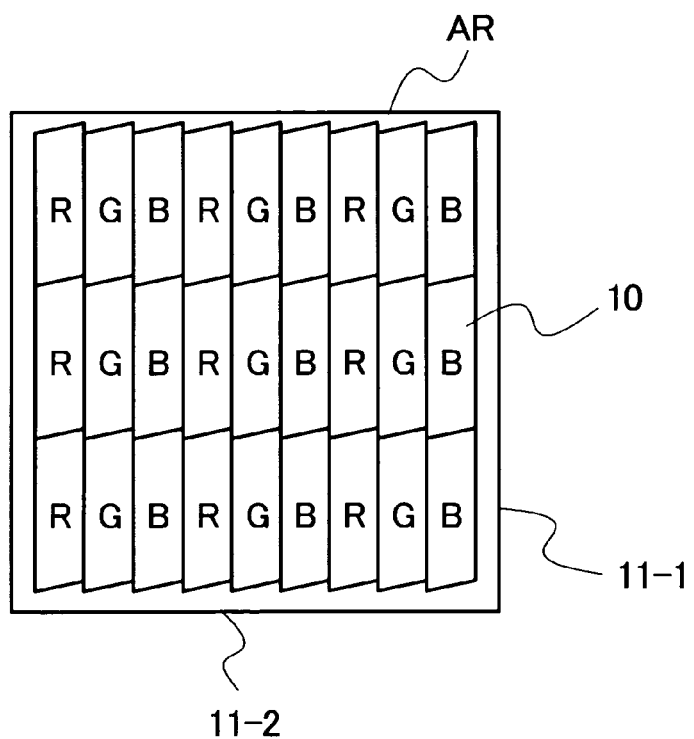
FIG. 11 is a schematic view showing the pixel arrangement of a liquid crystal display panel according to an embodiment 2 of the present invention.

FIG. 11 is a schematic view showing the pixel arrangement of a liquid crystal display panel according to an embodiment 2 of the present invention.

In the above-mentioned embodiment, linear portions of a pixel electrode (PX) extend in the direction along long sides out of long sides and short sides of each sub pixel. On the other hand, in this embodiment, linear portions of a pixel electrode (PX) extend in the direction along short sides out of long sides and short sides of each sub pixel.

The liquid crystal display panel of this embodiment differs from the liquid crystal display panel of the above-mentioned embodiment with respect to a point that the scanning lines (GL) are inclined. Accordingly, also in the liquid crystal display panel of this embodiment, sub pixels 10 having a parallelogram shape are arranged in the longitudinal direction as well as in the lateral direction.

Figure 12:
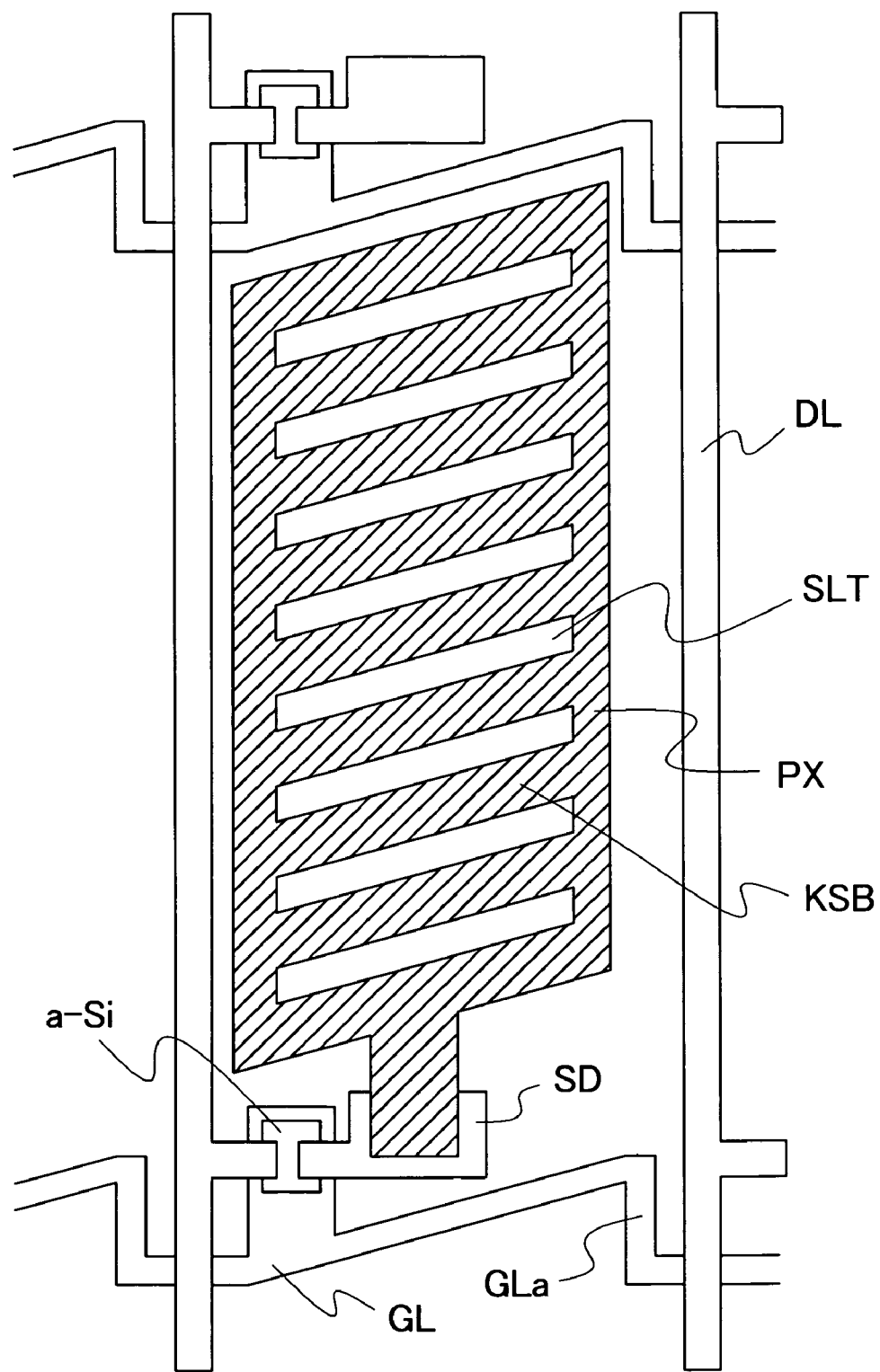
FIG. 12 is a schematic plan view for explaining the electrode structure of the liquid crystal display panel according to the embodiment 2 of the present invention.

FIG. 12 is a schematic plan view for explaining the electrode structure of the liquid crystal display panel according to this embodiment of the present invention.

In this embodiment, as shown in FIG. 12, the pixel adopts the single domain structure and hence, the linear portions of the pixel electrode (PX) extend in one direction in one sub pixel. Further, the linear portions of the pixel electrode (PX) are inclined with respect to the lateral direction in the drawing. Further, corresponding to the inclination of the linear portions of the pixel electrode (PX), the scanning lines (GL) are also inclined. Further, to ensure linearity of the pixel arrangement, the scanning line (GL) has a fold-back portion (GLa), wherein the fold-back portion (GLa) and the inclined portion of the scanning line (GL) forms a shape of numeral "7".

Here, the scanning line (GL) extends in a partially inclined or bent manner, that is, in a locally bent manner. However, when the scanning line (GL) is viewed as a whole, the scanning line (GL) extends in the second direction (in the direction along long sides 11-2 of a display region (AR)). Further, the video lines (DL) extend in the first direction (in the direction along short sides 11-1 of the display region (AR)).

Figure 13:
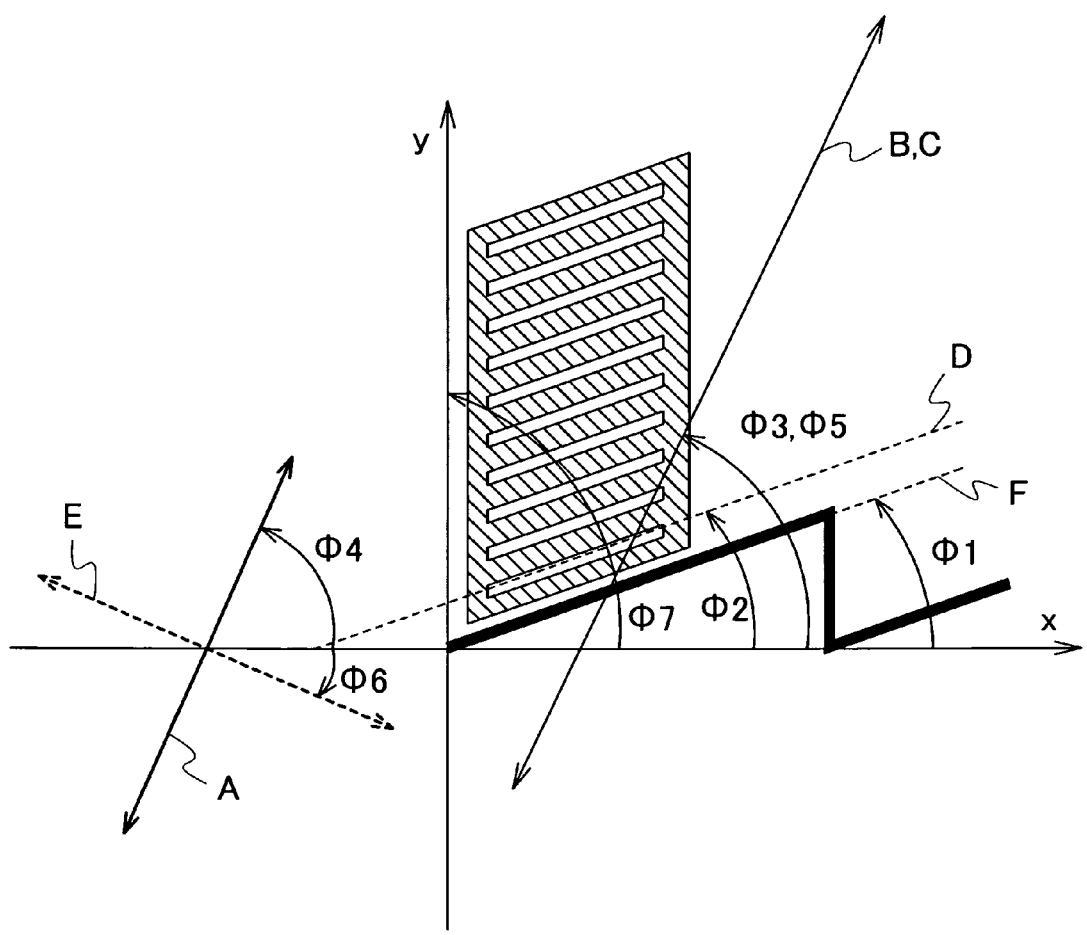
FIG. 13 is a view showing one example of a relationship among an absorption axis of a second polarizer, an alignment axis of a second alignment film, an extension direction of linear portions of a pixel electrode, an alignment axis of a first alignment film, and an absorption axis of a first polarizer in the liquid crystal display panel according to the embodiment 2 of the present invention.

FIG. 13 is a view showing one example of a relationship among an absorption axis of a second polarizer (POL2), an alignment axis of a second alignment film (AL2), an extension direction of linear portions of a pixel electrode (PX), an alignment axis of a first alignment film (AL1), and an absorption axis of a first polarizer (POL1) in the liquid crystal display panel of this embodiment.

In this embodiment, as shown in FIG. 13, in measuring angles φ1 to φ6 within a range of −90° to 90° from the second direction (x) while setting the clockwise direction as the normal direction, formulae equal to the above-mentioned formulae (1) are established. Here, the angle φ1 is an angle from the second direction (x) to the extension direction of a portion of the scanning line (GL).

That is, in this embodiment, the angles φ1 to φ6 can be generalized into following formulae (3).

(1) $10°\leq|\phi1|\leq|\phi3|$ and $10°\leq|\phi2|\leq|\phi3|$ (2) $0°\leq|\phi3-\phi2|\leq20°$ (3) $0°\leq|\phi1-\phi2|\leq2°$ (4) $10°\leq|\phi3|\leq80°$ (desirably $30°\leq|\phi3|\leq60°$)

(5) $0°\leq|\phi3-\phi4|\leq2°$ or $88°\leq|\phi3-\phi4|\leq92°$ (6) $0°\leq|\phi3-\phi5|\leq2°$ (7) $89°\leq|\phi4-\phi6|\leq91°$     (3)

Further, all of a sign of the angle φ1, a sign of the angle φ2 and a sign of the angle φ3 are equal in one sub pixel. Further, the angles φ1 of all sub pixels have the same sign.

Modification 1 of Embodiment 2

When the liquid crystal layer (LC) is made of negative liquid crystal, in the same manner as the above-mentioned embodiment, in place of the angle φ3, in accordance with the arrangement shown in FIG. 8, an angle (angle Φ3 not shown in the drawing) from the second direction (x) to the direction orthogonal to the alignment axis of the second alignment film (AL2) (the direction indicated by G in FIG. 8) may be used.

In the same manner, in place of the above-mentioned angle φ5, an angle (angle Φ5 not shown in the drawing) which is a narrow-side angle out of intersection angles between the second direction (x) and a direction (G in FIG. 8) orthogonal to the alignment axis (C in FIG. 8) of the first alignment film (AL1) and is measured in the clockwise direction from the second direction (x) may be used.

The angles Φ3 and Φ5 may be also measured within a range from −90° to +90°.

Accordingly, the above-mentioned formulae (3) are expressed by the following formulae (4).

(1) $10° \leq |\phi1| \leq |\Phi3|$ and $10° \leq |\phi2| \leq |\Phi3|$ (2) $0° \leq |\Phi3-\phi| \leq 20°$ (4) $10° \leq |\Phi3| \leq 80°$ (desirably $30° \leq \phi3 \leq 60°$)

(5) $0° \leq |\Phi3-\phi4| \leq 2°$ or $88° \leq |\Phi3-\phi4| \leq 92°$ (6) $0° \leq |\Phi3-\Phi5\,5| \leq 2°$ (7) $89° \leq |\phi4-6| \leq 91°$     (4)

Here, all of a sign of the angle $\phi1$, a sign of the angle $\phi2$ and a sign of the angle $\Phi3$ are equal in one sub pixel. Further, the angles $\phi1$ of all sub pixels have the same sign.

Modification 2 of Embodiment 2

Also in this embodiment, the delta arrangement may be used as the pixel arrangement.

Further, in FIG. 12, a video line (DL) is arranged orthogonal to (within an error range of ±2°) the second direction (x). That is, as shown in FIG. 13, assuming an angle which is a narrow-side angle out of intersection angles between the second direction (x) and the extension direction of the video line (DL) and is measured in the clockwise direction from the second direction (x) as $\phi7$, the relationship of $88° \leq |\phi7| \leq 90°$ is satisfied.

However, also in this modification, a portion of the video line (DL) may be also inclined. In this case, the video lines (DL) extend in the first direction (y) which intersects the second direction (x) as a whole while being locally bent (within an error range of ±2°), and an angle which is a narrow-side angle out of intersection angles between the second direction (x) and the extension direction of the portion of the video line (DL) and is measured in the clockwise direction from the second direction (x) is set to $\phi7$.

Further, the angle $\phi7$ desirably satisfies the relationship of $45 \leq |\phi7| \leq 90°$.

In the explanation of the above-mentioned embodiment 1 and embodiment 2, the explanation has been made with respect to the case in which the electrode structure shown in FIG. 14 is used as the electrode structure of the present invention. However, the electrode structure shown in FIG. 15 may be also used as the electrode structure of the present invention.

Further, in applying the electrode structure shown in FIG. 14 to the embodiment 1 and the embodiment 2, the electrodes formed on the liquid crystal (LC) side of the interlayer insulation film (PAS1) may be used as the counter electrodes (CT) and the electrodes formed on the side of the interlayer insulation film (PAS1) opposite to the liquid crystal (LC) may be used as the pixel electrodes (PX). In this case, the counter electrode (CT) is formed of an electrode having linear portions (for example, an electrode having a plurality of slits (SLT)) and the pixel electrode (PX) is formed of a planar electrode.

Further, symbol 11-1 in FIG. 1, FIG. 10, FIG. 11 and FIG. 19 may be used to indicate the long sides of the display region (AR) and symbol 11-2 may be used to indicate the short sides of the display region (AR).

Although the invention made by the inventors of the present invention has been specifically explained in conjunction with the embodiments heretofore, it is needless to say that the present invention is not limited by these embodiments and various modifications are conceivable without departing from the gist of the present invention.

What is claimed is:

1. A liquid crystal display device including a liquid crystal display panel which comprises: a first substrate; a second substrate arranged closer to a viewer's side than the first substrate; and positive liquid crystal sandwiched between the first substrate and the second substrate, wherein
   the liquid crystal display panel includes a plurality of sub pixels within a display region,
   each sub pixel of the plurality of sub pixels includes a first electrode formed on the first substrate and a second electrode formed on the first substrate, and
   the liquid crystal display panel is configured to drive the liquid crystal by generating an electric field using the difference in potential between the first electrode and the second electrode, wherein
   the first substrate includes: a first alignment film arranged on a liquid-crystal-side surface thereof; a plurality of video lines configured to input a video signal to the respective sub pixels; and a first polarizer arranged on a surface thereof opposite to the liquid crystal,
   the second substrate includes: a second alignment film arranged on a liquid-crystal-side surface thereof; and a second polarizer arranged on a surface thereof opposite to the liquid crystal,
   the first electrode includes linear portions which extend in a direction of long sides out of the long sides and short sides of each sub pixel,
   an extension direction of the linear portions of the first electrode in one sub pixel is set to one direction,
   the video lines extend in a first direction along an arbitrary one side of the display region of the liquid crystal display panel as a whole while being bent locally,
   the first direction is set as a reference direction, and
   assuming a narrow-side angle out of intersection angles between the reference direction and the extension direction of a portion of the video line as $\theta1$,
   assuming a narrow-side angle out of intersection angles between the reference direction and the extension direction of the linear portions of the first electrode as $\theta2$,
   assuming a narrow-side angle out of intersection angles between the reference direction and an alignment axis of the second alignment film as $\theta3$,
   assuming a narrow-side angle out of intersection angles between the reference direction and an absorption axis of the second polarizer as $\theta4$, and
   in measuring the angles $\theta1$, $\theta2$, $\theta3$ and $\theta4$ within a range from $-90°$ to $+90°$ from the reference direction while setting a clockwise direction as a normal direction,
   all of a sign of the angle $\theta1$, a sign of the angle $\theta2$ and a sign of the angle $\theta3$ are equal in one sub pixel, the angles $\theta1$ in all sub pixels have the same sign, and following formulae (1) to (5) are satisfied in all sub pixels.

$10° \leq |\theta1| \leq |\theta3|$ and $10° \leq |\theta2| \leq |\theta3|$     (1)

$0° \leq |\theta3-\theta2| \leq 20°$     (2)

$0° \leq |\theta1-\theta2| \leq 2°$     (3)

$10° \leq |\theta3| \leq 80°$     (4)

$0° \leq |\theta3-\theta4| \leq 2°$ or $88° \leq |\theta3-\theta4| \leq 92°$     (5)

2. A liquid crystal display device according to claim 1, wherein the angle $\theta3$ is set to satisfy a relationship of $30° \leq |\theta3| \leq 60°$.

3. A liquid crystal display device according to claim 1, wherein
assuming a narrow-side angle out of intersection angles between the reference direction and the alignment axis of the first alignment film as θ5,
assuming a narrow-side angle out of intersection angles between the reference direction and the absorption axis of the first polarizer as θ6, and
in measuring the angles θ5 and θ6 within a range from −90° to +90° from the reference direction while setting a clockwise direction as a normal direction,
a relationship of $0° \leq |θ3-θ5| \leq 2°$ and a relationship of $89° \leq |θ4-θ6| \leq 91°$ are satisfied.

4. A liquid crystal display device according to claim 1, wherein the angle θ1 is set to satisfy a relationship of $10° \leq |θ1| \leq 45°$.

5. A liquid crystal display device according to claim 4, wherein the angle θ1 is set to satisfy a relationship of $10° \leq |θ1| \leq 30°$.

6. A liquid crystal display device according to claim 1, wherein the plurality of sub pixels are arranged in the delta arrangement, and the angle θ1 is set to satisfy a relationship of $10° \leq |θ1| \leq 15°$.

7. A liquid crystal display device according to claim 1, wherein the first substrate includes a plurality of scanning lines which are configured to input a scanning signal to the respective sub pixels, the scanning lines extend in a second direction which intersects the first direction, and
assuming a narrow-side angle out of intersection angles between the reference direction and the extension direction of each scanning line of the plurality of scanning lines as θ7, a relationship of $88° \leq |θ7| \leq 90°$ is satisfied.

8. A liquid crystal display device according to claim 1, wherein the first substrate includes a plurality of scanning lines which are configured to input a scanning signal to the respective sub pixels,
the scanning line extends in a second direction which intersects the first direction as a whole while being bent locally, and
assuming a narrow-side angle out of intersection angles between the reference direction and the extension direction of a portion of the scanning line as θ7, a relationship of $45° \leq |θ7| \leq 90°$ is satisfied.

9. A liquid crystal display device according to claim 1, wherein the second electrode is an electrode which has linear portions, and has a non-overlapping portion with the first electrode.

10. A liquid crystal display device according to claim 1, wherein the second electrode is a planar electrode which is arranged below the first electrode by way of an insulation film, and overlaps with the first electrode.

11. A liquid crystal display device according to claim 1, wherein the first electrode is a pixel electrode, and the second electrode is a counter electrode.

12. A liquid crystal display device according to claim 1, wherein the first electrode is a counter electrode, and the second electrode is a pixel electrode.

13. A liquid crystal display device including a liquid crystal display panel which comprises: a first substrate; a second substrate arranged closer to a viewer's side than the first substrate; and negative liquid crystal sandwiched between the first substrate and the second substrate, wherein
the liquid crystal display panel includes a plurality of sub pixels within a display region,
each sub pixel of the plurality of sub pixels includes a first electrode formed on the first substrate and a second electrode formed on the first substrate, and
the liquid crystal display panel is configured to drive the liquid crystal by generating an electric field using the difference in potential between the first electrode and the second electrode, wherein
the first substrate includes: a first alignment film arranged on a liquid-crystal-side surface thereof; a plurality of video lines configured to input a video signal to the respective sub pixels; and a first polarizer arranged on a surface thereof opposite to the liquid crystal,
the second substrate includes: a second alignment film arranged on a liquid-crystal-side surface thereof; and a second polarizer arranged on a surface thereof opposite to the liquid crystal,
the first electrode includes linear portions which extend in a direction of long sides out of the long sides and short sides of each sub pixel,
an extension direction of the linear portions of the first electrode in one sub pixel is set to one direction,
the video lines extend in a first direction along an arbitrary one side of the display region of the liquid crystal display panel as a whole while being bent locally,
the first direction is set as a reference direction, and
assuming a narrow-side angle out of intersection angles between the reference direction and the extension direction of a portion of the video line as θ1,
assuming a narrow-side angle out of intersection angles between the reference direction and the extension direction of the linear portions of the first electrode as θ2,
assuming a narrow-side angle out of intersection angles between the reference direction and a direction orthogonal to an alignment axis of the second alignment film as Θ3,
assuming a narrow-side angle out of intersection angles between the reference direction and an absorption axis of the second polarizer as θ4, and
in measuring the angles θ1, θ2, Θ3 and θ4 within a range from −90° to +90° from the reference direction while setting a clockwise direction as a normal direction,
all of a sign of the angle θ1, a sign of the angle θ2 and a sign of the angle Θ3 are equal in one sub pixel, the angles θ1 of all sub pixels have the same sign, and following formulae (1) to (5) are satisfied in all sub pixels.

$$10° \leq |θ1| \leq |Θ3| \text{ and } 10° \leq |θ2| \leq |Θ3| \qquad (1)$$

$$0° \leq |Θ3-θ2| \leq 20° \qquad (2)$$

$$0° \leq |θ1-θ2| \leq 2° \qquad (3)$$

$$10° \leq |Θ3| \leq 80° \qquad (4)$$

$$0° \leq |Θ3-θ4| \leq 2° \text{ or } 88° \leq |Θ3-θ4| \leq 92° \qquad (5)$$

14. A liquid crystal display device according to claim 13, wherein the angle Θ3 is set to satisfy a relationship of $30° \leq |Θ3| \leq 60°$.

15. A liquid crystal display device according to claim 13, wherein
assuming a narrow-side angle out of intersection angles between the reference direction and a direction orthogonal to the alignment axis of the first alignment film as Θ5,
assuming a narrow-side angle out of intersection angles between the reference direction and the absorption axis of the first polarizer as θ6, and
in measuring the angles Θ5 and θ6 within a range from −90° to +90° from the reference direction while setting a clockwise direction as a normal direction, a relationship of $0° \leq |\Theta 3 - \Theta 5| \leq 2°$ and a relationship of $89° \leq |\theta 4 - \theta 6| \leq 91°$ are satisfied.

16. A liquid crystal display device according to claim 13, wherein the angle θ1 is set to satisfy a relationship of $10° \leq |\theta 1| \leq 45°$.

17. A liquid crystal display device according to claim 16, wherein the angle θ1 is set to satisfy a relationship of $10° \leq |\theta 1| \leq 30°$.

18. A liquid crystal display device according to claim 13, wherein the plurality of sub pixels are arranged in the delta arrangement, and the angle θ1 is set to satisfy a relationship of $10° \leq |\theta 1| \leq 15°$.

19. A liquid crystal display device according to claim 13, wherein the first substrate includes a plurality of scanning lines which are configured to input a scanning signal to the respective sub pixels, the scanning lines extend in a second direction which intersects the first direction, and assuming a narrow-side angle out of intersection angles between the reference direction and the extension direction of each scanning line of the plurality of scanning lines as θ7, a relationship of $88° \leq |\theta 7| \leq 90°$ is satisfied.

20. A liquid crystal display device according to claim 13, wherein the first substrate includes a plurality of scanning lines which are configured to input a scanning signal to the respective sub pixels, the scanning line extends in a second direction which intersects the first direction as a whole while being bent locally, and assuming a narrow-side angle out of intersection angles between the reference direction and the extension direction of a portion of the scanning line as θ7, a relationship of $45° \leq |\theta 7| \leq 90°$ is satisfied.

21. A liquid crystal display device according to claim 13, wherein the second electrode is an electrode which has linear portions, and has a non-overlapping portion with the first electrode.

22. A liquid crystal display device according to claim 13, wherein the second electrode is a planar electrode which is arranged below the first electrode by way of an insulation film, and overlaps with the first electrode.

23. A liquid crystal display device according to claim 13, wherein the first electrode is a pixel electrode, and the second electrode is a counter electrode.

24. A liquid crystal display device according to claim 13, wherein the first electrode is a counter electrode, and the second electrode is a pixel electrode.

25. A liquid crystal display device including a liquid crystal display panel which comprises: a first substrate; a second substrate arranged closer to a viewer's side than the first substrate; and positive liquid crystal sandwiched between the first substrate and the second substrate, wherein the liquid crystal display panel includes a plurality of sub pixels within a display region, each sub pixel of the plurality of sub pixels includes a first electrode formed on the first substrate and a second electrode formed on the first substrate, and the liquid crystal display panel is configured to drive the liquid crystal by generating an electric field using the difference in potential between the first electrode and the second electrode, wherein the first substrate includes: a first alignment film arranged on a liquid-crystal-side surface thereof; a plurality of scanning lines configured to input a scanning signal to the respective sub pixels; and a first polarizer arranged on a surface thereof opposite to the liquid crystal, the second substrate includes: a second alignment film arranged on a liquid-crystal-side surface thereof; and a second polarizer arranged on a surface thereof opposite to the liquid crystal, the first electrode includes linear portions which extend in a direction of short sides out of long sides and the short sides of each sub pixel, an extension direction of the linear portions of the first electrode in one sub pixel is set to one direction, the scanning lines extend in a first direction along an arbitrary one side of the display region of the liquid crystal display panel as a whole while being bent locally, the first direction is set as a reference direction, and assuming a narrow-side angle out of intersection angles between the reference direction and the extension direction of a portion of the scanning line as φ1, assuming a narrow-side angle out of intersection angles between the reference direction and the extension direction of the linear portions of the first electrode as φ2, assuming a narrow-side angle out of intersection angles between the reference direction and an alignment axis of the second alignment film as φ3, assuming a narrow-side angle out of intersection angles between the reference direction and an absorption axis of the second polarizer as φ4, and in measuring the angles φ1, φ2, φ3 and φ4 within a range from −90° to +90° from the reference direction while setting a clockwise direction as a normal direction, all of a sign of the angle φ1, a sign of the angle φ2 and a sign of the angle φ3 are equal in one sub pixel, the angles φ1 of all sub pixels have the same sign, and following formulae (1) to (5) are satisfied in all sub pixels.

$10° \leq |\phi 1| \leq |\phi 3|$ and $10° \leq |\phi 2| \leq |\phi 3|$ (1)

$0° \leq |\phi 3 - \phi 2| \leq 20°$ (2)

$0° \leq |\phi 1 - \phi 2| \leq 2°$ (3)

$10° \leq |\phi 3| \leq 80°$ (4)

$0° \leq |\phi 3 - \phi 4| \leq 2°$ or $88° \leq |\phi 3 - \phi 4| \leq 92°$ (5)

26. A liquid crystal display device according to claim 25, wherein the angle φ3 is set to satisfy a relationship of $30° \leq |\phi 3| \leq 60°$.

27. A liquid crystal display device according to claim 25, wherein assuming a narrow-side angle out of intersection angles between the reference direction and the alignment axis of the first alignment film as φ5, assuming a narrow-side angle out of intersection angles between the reference direction and the absorption axis of the first polarizer as φ6, and in measuring the angles φ5 and φ6 within a range from −90° to +90° from the reference direction while setting a clockwise direction as a normal direction, a relationship of $0 \leq |\phi 3 - \phi 5| \leq 2°$ and a relationship of $89° \leq |\phi 4 - \phi 6| \leq 91°$ are satisfied.

28. A liquid crystal display device according to claim 25, wherein the angle φ1 is set to satisfy a relationship of $10° \leq |\phi 1| \leq 45°$.

29. A liquid crystal display device according to claim 28, wherein the angle φ1 is set to satisfy a relationship of $10° \leq |\phi 1| \leq 30°$.

30. A liquid crystal display device according to claim 25, wherein the first substrate includes a plurality of video lines which are configured to input a video signal to the respective sub pixels, the video lines extend in a second direction which intersects the first direction, and assuming a narrow-side angle out of intersection angles between the reference direction and the extension direction of each video line of the plurality of video lines as φ7, a relationship of 88°≦|φ7|≦90° is satisfied.

31. A liquid crystal display device according to claim 25, wherein the first substrate includes a plurality of video lines which are configured to input a video signal to the respective sub pixels, the video line extends in a second direction which intersects the first direction as a whole while being bent locally, and assuming a narrow-side angle out of intersection angles between the reference direction and the extension direction of a portion of the video line as φ7, a relationship of 45°≦|φ7|≦90° is satisfied.

32. A liquid crystal display device according to claim 25, wherein the second electrode is an electrode which has linear portions, and has a non-overlapping portion with the first electrode.

33. A liquid crystal display device according to claim 25, wherein the second electrode is a planar electrode which is arranged below the first electrode by way of an insulation film, and overlaps with the first electrode.

34. A liquid crystal display device according to claim 25, wherein the first electrode is a pixel electrode, and the second electrode is a counter electrode.

35. A liquid crystal display device according to claim 25, wherein the first electrode is a counter electrode, and the second electrode is a pixel electrode.

36. A liquid crystal display device including a liquid crystal display panel which comprises: a first substrate; a second substrate arranged closer to a viewer's side than the first substrate; and negative liquid crystal sandwiched between the first substrate and the second substrate, wherein the liquid crystal display panel includes a plurality of sub pixels within a display region, each sub pixel of the plurality of sub pixels includes a first electrode formed on the first substrate and a second electrode formed on the first substrate, and the liquid crystal display panel is configured to drive the liquid crystal by generating an electric field using the difference in potential between the first electrode and the second electrode, wherein the first substrate includes: a first alignment film arranged on a liquid-crystal-side surface thereof; a plurality of scanning lines configured to input a scanning signal to the respective sub pixels; and a first polarizer arranged on a surface thereof opposite to the liquid crystal, the second substrate includes: a second alignment film arranged on a liquid-crystal-side surface thereof; and a second polarizer arranged on a surface thereof opposite to the liquid crystal, the first electrode includes linear portions which extend in a direction of short sides out of long sides and the short sides of each sub pixel, an extension direction of the linear portions of the first electrode in one sub pixel is set to one direction, the scanning lines extend in a first direction along an arbitrary one side of the display region of the liquid crystal display panel as a whole while being bent locally, the first direction is set as a reference direction, and assuming a narrow-side angle out of intersection angles between the reference direction and the extension direction of a portion of the scanning line as φ1, assuming a narrow-side angle out of intersection angles between the reference direction and the extension direction of the linear portions of the first electrode as φ2, assuming a narrow-side angle out of intersection angles between the reference direction and a direction orthogonal to an alignment axis of the second alignment film as Φ3, assuming a narrow-side angle out of intersection angles between the reference direction and an absorption axis of the second polarizer as φ4, and in measuring the angles φ1, φ2, Φ3 and φ4 within a range from −90° to +90° from the reference direction while setting a clockwise direction as a normal direction, all of a sign of the angle φ1, a sign of the angle φ2 and a sign of the angle Φ3 are equal in one sub pixel, the angles φ1 of all sub pixels have the same sign, and following formulae (1) to (5) are satisfied in all sub pixels.

$$10°≦|φ1|≦|Φ3| \text{ and } 10°≦|φ2|≦|Φ3| \tag{1}$$

$$0°≦Φ3-φ2|≦20° \tag{2}$$

$$0°≦|φ1-φ2|≦2° \tag{3}$$

$$10°≦|Φ3|≦80° \tag{4}$$

$$0°≦|Φ3-φ4|≦2° \text{ or } 88°≦|Φ3-φ4|≦92° \tag{5}$$

37. A liquid crystal display device according to claim 36, wherein the angle Φ3 is set to satisfy a relationship of 30°≦|Φ3|≦60°.

38. A liquid crystal display device according to claim 36, wherein assuming a narrow-side angle out of intersection angles between the reference direction and a direction orthogonal to the alignment axis of the first alignment film as Φ5, assuming a narrow-side angle out of intersection angles between the reference direction and the absorption axis of the first polarizer as φ6, and in measuring the angles Φ5 and φ6 within a range from −90° to +90° from the reference direction while setting a clockwise direction as a normal direction, a relationship of 0°≦|Φ3−Φ5|≦2° and a relationship of 89°≦|φ4−φ6|≦91° are satisfied.

39. A liquid crystal display device according to claim 36, wherein the angle φ1 is set to satisfy a relationship of 10°≦|φ1|≦45°.

40. A liquid crystal display device according to claim 39, wherein the angle φ1 is set to satisfy a relationship of 10°≦|φ1|≦30°.

41. A liquid crystal display device according to claim 36, wherein the first substrate includes a plurality of video lines which are configured to input a video signal to the respective sub pixels, the video lines extend in a second direction which intersects the first direction, and assuming a narrow-side angle out of intersection angles between the reference direction and the extension direction of each video line of the plurality of video lines as φ7, a relationship of 88°≦|φ7|≦90° is satisfied.

42. A liquid crystal display device according to claim 36, wherein the first substrate includes a plurality of video lines which are configured to input a video signal to the respective sub pixels, the video line extends in a second direction which intersects the first direction as a whole while being bent locally, and assuming a narrow-side angle out of intersection angles between the reference direction and the extension direction of a portion of the video line as $\phi 7$, a relationship of $45 \leqq |\phi 7| \leqq 90°$ is satisfied.

43. A liquid crystal display device according to claim 36, wherein the second electrode is an electrode which has linear portions, and has a non-overlapping portion with the first electrode.

44. A liquid crystal display device according to claim 36, wherein the second electrode is a planar electrode which is arranged below the first electrode by way of an insulation film, and overlaps with the first electrode.

45. A liquid crystal display device according to claim 36, wherein the first electrode is a pixel electrode, and the second electrode is a counter electrode.

46. A liquid crystal display device according to claim 36, wherein the first electrode is a counter electrode, and the second electrode is a pixel electrode.

* * * * *

UNITED STATES PATENT AND TRADEMARK OFFICE
CERTIFICATE OF CORRECTION

| | | |
|---|---|---|
| PATENT NO. | : 7,796,226 B2 | Page 1 of 1 |
| APPLICATION NO. | : 12/289502 | |
| DATED | : September 14, 2010 | |
| INVENTOR(S) | : Yamada et al. | |

It is certified that error appears in the above-identified patent and that said Letters Patent is hereby corrected as shown below:

Title Page;
On the face of the patent, Under Item (73) please amend the Assignee from --IPS Alpha Technology , Ltd., Chiba (JP) and Hitachi Displays, Ltd., Chiba (JP).— to "Hitachi Displays, Ltd., Chiba (JP)"

Signed and Sealed this
Nineteenth Day of July, 2011

David J. Kappos
*Director of the United States Patent and Trademark Office*